(12) United States Patent
Kurahara et al.

(10) Patent No.: US 11,742,936 B2
(45) Date of Patent: Aug. 29, 2023

(54) INFORMATION PROCESSING DEVICE, INFORMATION PROCESSING METHOD, AND PROGRAM

(71) Applicant: Infostellar Inc., Tokyo (JP)

(72) Inventors: Naomi Kurahara, Tokyo (JP); Kazuo Ishigame, Tokyo (JP)

(73) Assignee: Infostellar Inc., Tokyo (JP)

( * ) Notice: Subject to any disclaimer, the term of this patent is extended or adjusted under 35 U.S.C. 154(b) by 282 days.

(21) Appl. No.: 17/413,909

(22) PCT Filed: Aug. 16, 2019

(86) PCT No.: PCT/JP2019/032137
§ 371 (c)(1),
(2) Date: Jun. 14, 2021

(87) PCT Pub. No.: WO2020/136984
PCT Pub. Date: Jul. 2, 2020

(65) Prior Publication Data
US 2022/0060254 A1 Feb. 24, 2022

(30) Foreign Application Priority Data

Dec. 27, 2018 (JP) .................... 2018-245669
Jun. 20, 2019 (JP) .................... 2019-114637

(51) Int. Cl.
*H04B 7/185* (2006.01)
*H04B 7/155* (2006.01)
*H04W 72/53* (2023.01)

(52) U.S. Cl.
CPC ..... *H04B 7/18539* (2013.01); *H04B 7/15542* (2013.01); *H04W 72/53* (2023.01)

(58) Field of Classification Search
CPC .......... H04B 7/18539; H04B 7/15542; H04W 72/0493
See application file for complete search history.

(56) References Cited

U.S. PATENT DOCUMENTS 5,400,254 A * 3/1995 Fujita ................ G01S 19/13
342/357.57
10,054,686 B2 8/2018 Jobanputra et al.
(Continued)

FOREIGN PATENT DOCUMENTS

CN 104090489 A 10/2014
CN 108631855 A 10/2018
(Continued)

OTHER PUBLICATIONS

International Search Report dated Oct. 16, 2019 for PCT Application No. PCT/JP2019/032137.
(Continued)

*Primary Examiner* — Dominic E Rego
(74) *Attorney, Agent, or Firm* — EIP US LLP

(57) ABSTRACT

An information processing device calculates a communication available period for communication between a satellite station and an earth station on the basis of orbit information regarding the satellite station and location information regarding the earth station, and performs reservation processing for reserving a communication reservation period for the communication between the satellite station and the earth station, among reservation target periods selected from the communication available period.

11 Claims, 17 Drawing Sheets

(56) References Cited

U.S. PATENT DOCUMENTS

| | | | |
|---|---|---|---|
| 2010/0060519 A1* | 3/2010 | Uchida | G01S 19/05 342/357.64 |
| 2010/0238856 A1* | 9/2010 | Argov | H04B 7/1858 370/317 |
| 2012/0026033 A1* | 2/2012 | Shiomi | G01S 19/42 342/357.25 |
| 2017/0214462 A1 | 7/2017 | Busche et al. | |
| 2018/0343055 A1* | 11/2018 | Olson | H04B 7/185 |
| 2019/0121665 A1 | 4/2019 | Clancy et al. | |
| 2020/0024001 A1 | 1/2020 | Nishiyama et al. | |

FOREIGN PATENT DOCUMENTS

| | | |
|---|---|---|
| EP | 0963061 A2 | 12/1999 |
| EP | 3208950 A1 | 8/2017 |
| EP | 3489154 A1 | 5/2019 |
| EP | 3514984 A1 | 7/2019 |
| JP | 2005-328351 A | 11/2005 |
| JP | 2009094936 A | 4/2009 |
| JP | 2010-208599 A | 9/2010 |
| JP | 2010-258507 A | 11/2010 |
| JP | 2017-139754 A | 8/2017 |
| WO | 2018016471 A1 | 1/2018 |
| WO | 2019079796 A1 | 4/2019 |

OTHER PUBLICATIONS

Written Opinion dated Oct. 16, 2019 for PCT Application No. PCT/JP2019/032137.

Miaoqin et al.: Attitude Selection of Dual Spin Communication Satellite, Chinese Academy of Space Technology, Oct. 1990.

Si-Yun: Research on The Selection Strategy of UAV Communication Link in The Space-Earth Integration Network, Computer Engineering and Software, Sep. 15, 2016, vol. 37, No. 9.

Office Action dated Mar. 16, 2022 for Chinese Application No. 201980081236.3.

Extended European Search Report dated Jan. 21, 2022 for EP Application No. 19905910.6.

* cited by examiner

FIG. 9

StellarStation

Available passes ↻ Reload                                                                 ⊕ Filters ∨

| AOS | LOS | Duration | Max Elevation | Location | Status | |
|---|---|---|---|---|---|---|
| 2018/12/08 14:06:32 | 2018/12/08 14:20:32 | 14:00 | 29° | Inuvik | Cancelled | + |
| 2018/12/08 19:03:32 | 2018/12/08 19:18:32 | 15:00 | 75° | Inuvik | Completed | ⊥ |
| 2018/12/09 05:34:32 | 2018/12/08 19:18:32 | 15:00 | 75° | Tokyo | Cancelled | + |
| 2018/12/11 11:49:32 | 2018/12/09 05:48:32 | 14:00 | 33° | Tokyo | Cancelled | + |
| 2018/12/12 03:18:32 | 2018/12/11 12:04:32 | 15:00 | 75° | Inuvik | Cancelled | + |
| 2018/12/20 03:26:32 | 2018/12/12 03:33:32 | 15:00 | 87° | Inuvik | Cancelled | + |
| 2018/12/21 23:40:07 | 2018/12/20 03:41:32 | 15:00 | 85° | Inuvik | Completed | ⊥ |
| 2018/12/22 01:21:13 | 2018/12/21 23:52:02 | 11:55 | 10° | Inuvik | Cancelled | + |
| 2018/12/22 03:02:16 | 2018/12/22 01:36:13 | 15:00 | 29° | Tokyo | Completed | ⊥ |
| 2018/12/22 04:43:03 | 2018/12/22 03:18:11 | 15:55 | 78° | Inuvik | Cancelled | + |
| 2018/12/22 06:23:20 | 2018/12/22 04:58:29 | 15:26 | 46° | Tokyo | Reserved | × |
|  | 2018/12/22 06:37:50 | 14:30 | 27° | Inuvik | Available | + |

FIG. 10

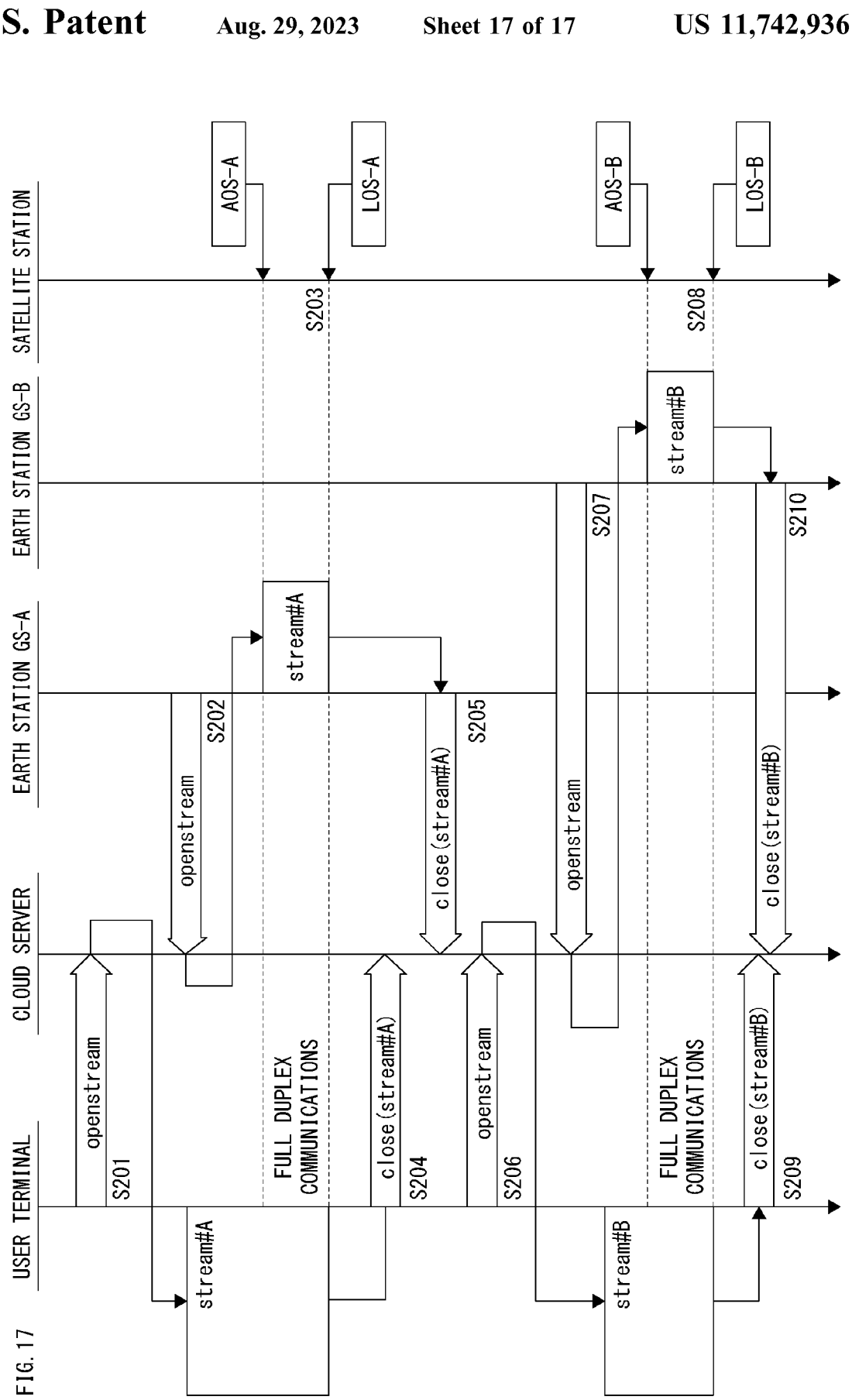

INFORMATION PROCESSING DEVICE, INFORMATION PROCESSING METHOD, AND PROGRAM

CROSS-REFERENCE TO RELATED APPLICATIONS

This application is a 371 application of International Application No. PCT/JP2019/032137, filed Aug. 16, 2019, which claims priority to Japanese Application No. JP2018-245669, filed Dec. 27, 2018, and Japanese Application No. JP2019-114637, filed Jun. 20, 2019, under 35 U.S.C. § 119(a). Each of the above-referenced patent applications is incorporated by reference in its entirety.

TECHNICAL FIELD

The present technology relates to an information processing device, an information processing method, and a program, and in particular to a technology for communication between a satellite station and an earth station.

BACKGROUND ART

Communication systems for communication between a satellite station and an earth station installed on the ground have been known.

There is disclosed, in PTL 1, a communication system that performs communication in such a way as to, while causing a ground antenna of an earth station installed on the ground of the earth to track a satellite station orbiting the center of the earth substantially as the center of its orbit, propagate radio waves between the ground antenna and a satellite antenna of the satellite station.

CITATION LIST

Patent Literature

PTL 1: Japanese Patent Laid-open No. 2010-258507

SUMMARY

Technical Problem

Incidentally, in an earth station, generally, the operating time of a ground antenna for an orbiting satellite is approximately 40 minutes per day with respect to one satellite station, and such a ground antenna normally has a long non-operating time. Meanwhile, although the ground antenna has such a long non-operating time, in a satellite station, a situation arises in which communication time for communication with a large number of ground antennas cannot be sufficiently secured. For this reason, it is desired to provide a platform that leverages the non-operating time of the ground antenna and thereby enables satellite business proprietors to obtain usage opportunities of a larger number of ground antennas and secure more sufficient communication time with the ground antennas.

Thus, an object of the present technology is to provide a platform that is utilizable by ground antenna business proprietors and satellite business proprietors and that enables an antenna owner to lend a non-operating time of an antenna for an orbiting satellite to another satellite business proprietor to allow the other satellite business proprietor to use the non-operating time, so that the satellite business proprietors can obtain usage opportunities of a larger number of antennas and secure more sufficient communication time with the antennas.

Solution to Problem

An information processing device according to the present technology includes a period calculation section that calculates a communication available period for communication between a satellite station and an earth station on the basis of orbit information regarding the satellite station and location information regarding the earth station, and a reservation management section that performs reservation processing for reserving a communication reservation period for the communication between the satellite station and the earth station, among reservation target periods selected from the communication available period.

This configuration makes it possible to reserve a communication reservation period from the reservation target periods that are narrowed down from the communication available period.

In the information processing device according to the present technology, the reservation management section selects the reservation target periods from the communication available period by performing selection processing according to a selected plan.

This configuration makes it possible to reserve a communication reservation period from the reservation target periods in which the contents of the selected plan are reflected.

In the information processing device according to the present technology, in a network including a plurality of earth stations conforming to mutually different technical specifications, the period calculation section and the reservation management section perform the respective pieces of processing for the plurality of earth stations.

This configuration enables the plurality of earth stations conforming to the mutually different technical specifications to be connected on the network, and an earth station communicable with the satellite station is selected from the plurality of earth stations on the network.

The information processing device according to the present technology may further include a presentation control section that causes the reservation target periods selected by the reservation management section to be presented.

With this configuration, the reservation target periods that are reservable are presented on a user terminal of a satellite business proprietor.

In the information processing device according to the present technology, the reservation management section may not select, as the reservation target periods, a period which is a portion of the communication available period calculated by the period calculation section and for which a usage limitation has been specified by an earth station.

This configuration enables a ground antenna business proprietor to prevent a period during which its owned antenna is to be used for its own purpose from being reserved by a satellite business proprietor as a communication reservation period.

In the information processing device according to the present technology, as the selection processing in a case where a first plan is selected, the reservation target periods may be selected from the communication available period on the basis of a condition specified by a user.

That is, upon selection of the first plan from a plurality of plans, the reservation target periods according to the conditions associated with an area, time, and the like, which have been specified by the user are automatically selected.

In the embodiment described below, a condition specification reservation plan will be described as an example of the first plan.

In the information processing device according to the present technology, the condition specified by the user may include area information regarding an area within which the satellite station and the earth station are to perform the communication.

With this configuration, the reservation target periods are selected from a communication available period of a communicable earth station, on the basis of the area information specified by the user.

In the information processing device according to the present technology, the condition specified by the user may include time information regarding a duration time during which the satellite station and the earth station are to perform the communication.

With this configuration, on the basis of the time information regarding a duration time during which a user (satellite business proprietor) desires to perform communication between its owned satellite station and an earth station, the reservation target periods are selected from a communication available period of an earth station communicable during the duration time.

In the information processing device according to the present technology, as the selection processing in a case where a second plan is selected, the reservation management section may select, as the communication reservation period for the communication between the satellite station and the earth station, a reservation target period selected by a user from among the reservation target periods presented by the presentation control section.

With this configuration, upon selection of the second plan from a plurality of plans, the user reserves a communication reservation period that the user has selected, from among reservation target periods of a communicable earth station, on the basis of selection of the user itself.

In the embodiment described below, an on-demand reservation plan will be described as an example of the second plan.

An information processing method according to the present technology performs a period calculation step of calculating a communication available period for communication between a satellite station and an earth station on the basis of orbit information regarding the satellite station and location information regarding the earth station, and a reservation management step of performing reservation processing for reserving a communication reservation period for the communication between the satellite station and the earth station, among reservation target periods selected from the communication available period.

The program according to the present technology is a program that causes an information processing device to perform the above-described individual procedures.

Advantageous Effects

According to the present technology, a satellite business proprietor can easily secure a communication period with respect to an earth station communicable with its owned satellite station.

Note that the effects of the present technology are not necessarily limited to the effect described herein, and may include any of effects described in the present disclosure.

BRIEF DESCRIPTION OF DRAWINGS

FIG. 9 is a diagram illustrating a schedule screen for a satellite station possessed by the satellite business proprietor.

FIG. 10 is a diagram illustrating a display screen for display of image data that an earth station has obtained through communication with a satellite station.

FIG. 17 is a diagram illustrating communication between a satellite station and earth stations.

DESCRIPTION OF EMBODIMENTS

Figure 1:
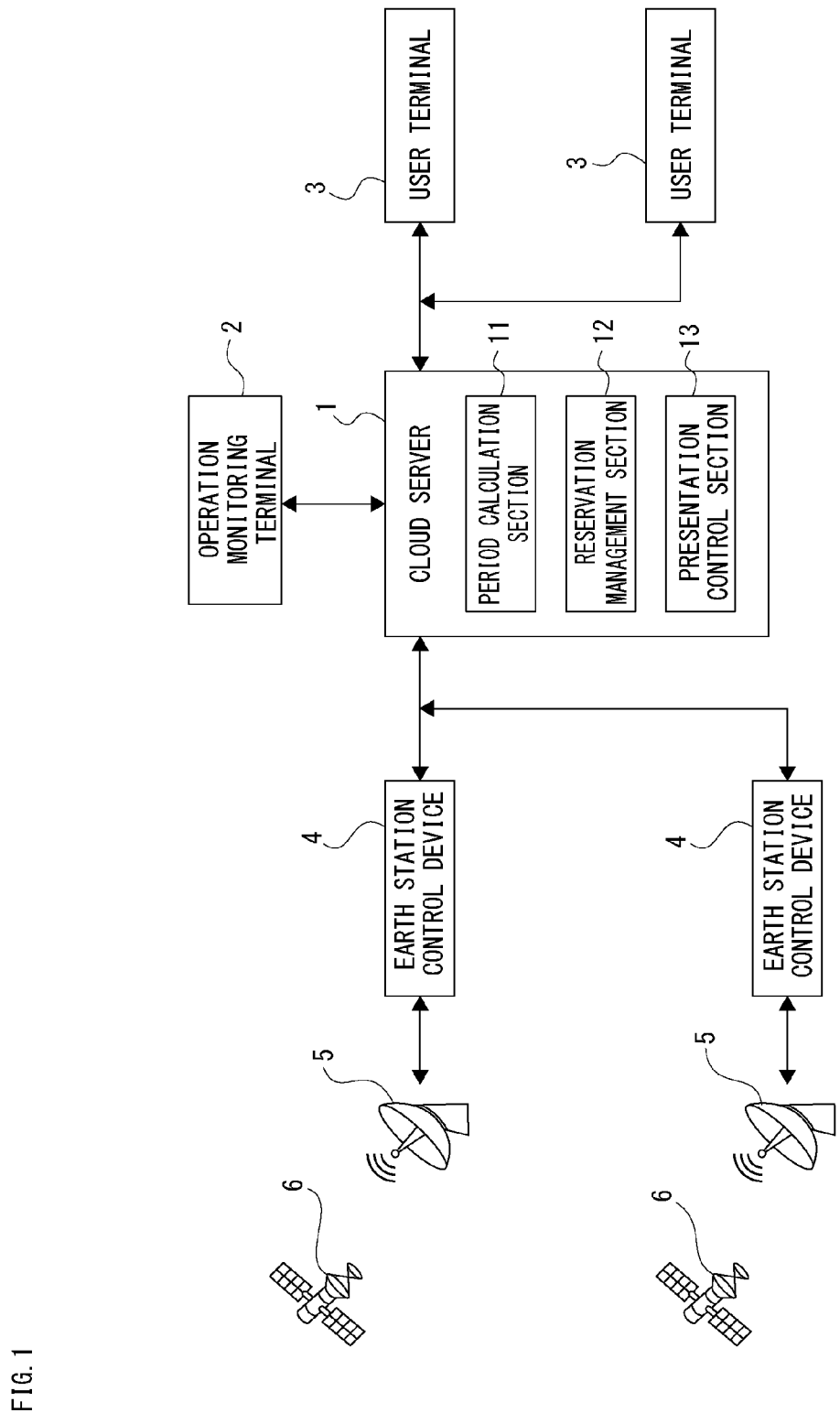
FIG. 1 is a diagram illustrating an entire configuration of a network system, including a platform.

Hereinafter, an embodiment will be described in the following order.

<1. Entire configuration>
<2. Presentation forms in user terminal>
  [2-1. Schedule coordination at ground antenna business proprietor side]
  [2-2. Schedule coordination at satellite business proprietor side]
<3. Matching between satellite station and ground station>
<4. APIs used in cloud server>
<5. Outline of execution of communication based on reserved communication reservation period>
<6. Summary>
<7. Program and storage medium>

Further, the meaning of each of phrases used in the embodiment of the present invention will be explained below.

StellarStation (Registered Trademark)

This is a cloud-based platform provided by the applicant and used for sharing various earth stations scattered at various locations around the world.

StarPass (Under Registration Application of Trademark)

This means hardware necessary to make an earth station available on StellarStation. In StarPass, for example, control of a ground antenna of an earth station, data transfer when an earth station and a cloud server transmit/receive data to/from each other, and the like are performed.

Earth Station Control Device

This is hardware that is included in StarPass and that is used for mediating the connection of an earth station to the cloud to integrate a plurality of earth stations.

Satellite Station

This means an artificial satellite (artificial satellite station) serving as a station that performs wireless communication. An antenna mounted in a satellite station will be referred to as a satellite antenna. A satellite station is, for example, an artificial satellite that orbits the earth.

Earth Station

This means a ground-side wireless communication facility for communicating with a satellite station. An earth station includes wireless equipment such as an antenna. An antenna mounted in an earth station will be referred to as a ground antenna.

Note that an earth station will also be referred to as a ground station or a GS.

User

This is an entity that uses the platform provided by the applicant, and means, for example, a satellite business proprietor, a ground antenna business proprietor, or the like.

Satellite Business Proprietor

This is a business proprietor that operates a satellite station. The satellite business proprietor may possess a ground antenna used for communicating with its owned satellite station. That is, the satellite business proprietor may also be a ground antenna business proprietor.

Ground Antenna Business Proprietor

This is a business proprietor that operates an earth station. Examples of the ground antenna business proprietor include, but are not limited to, a provider of services such as a teleport service, which use an earth station, a university, a research institute, and a satellite business proprietor possessing a ground antenna used for communicating with its owned satellite. Further, the business proprietor that operates an earth station encompasses not only an owner of an earth station, but also an entity that rents an earth station.

Note that the ground antenna business proprietor will also be referred to as a ground antenna owner, a ground station owner, or an earth station owner.

Pass

This means one communication opportunity from beginning to ending of communication between one satellite station and one earth station.

Communication Available Period

This means a duration time during which an orbiting satellite station can communicate in a wireless manner with an earth station that is a communication counterpart of the satellite station.

The communication available period is not limited to one pass but may include a plurality of passes. For example, a method of combining a plurality of passes in such a way that communication with an earth station and communication with another station are respectively performed in the anterior half and the posterior half of a communication available period may be employed to secure a long-time communication available period.

Reservation Target Period

This means a period that is a portion of the communication available period and that a satellite business proprietor using the platform is able to reserve. A situation sometimes occurs in which a ground antenna business proprietor cannot lend an earth station to a satellite business proprietor even in a communication available period, because of a reason that the ground antenna business proprietor uses the earth station for communication with its owned satellite station during the period, or any other similar reason. Thus, a reservation target period is described so as to be distinguished from a communication available period. Note that the reservation target period is a period obtained by excluding a usage limited period and a communication reservation period from the communication available period.

Communication Reservation Period

This means a period selected as a reservation target from reservation target periods. A communication reservation period is reserved as a duration time during which a satellite station that a satellite business proprietor operates and an earth station being lent are to communicate with each other. A communication reservation period will also be referred to as a pass schedule.

Pass Scheduling

This means setting (reserving) a communication reservation period from communication available periods. Specifically, this means a series of processing for calculating communication available periods for communication between a satellite station and an earth station on the basis of orbit information regarding the satellite station and location information regarding the earth station, selecting reservation target periods from the communication available periods by performing selection processing according to a selected plan, and reserving a communication reservation period for the communication between the satellite station and the earth station from the selected reservation target periods.

Pass Conflict

This means a situation in which communication available periods of a plurality of satellite stations overlap with one another with respect to one earth station.

Usage Limited Period

This means a duration time during which, for a ground antenna possessed by a ground antenna business proprietor, no communication duration time is to be lent. A usage limited period is set because of, for example, a reason that a ground antenna business proprietor uses its owned ground antenna for the purpose of its own communication, a reason for the maintenance of a ground antenna, or any other similar reason.

A usage limited period is set by, for example, a ground antenna business proprietor. Note that, however, an entity that sets a usage limited period is not limited to ground antenna business proprietors, and a usage limited period may be set by, for example, an administrator side, or may be made settable by a satellite business proprietor side.

Note that a usage limited period may also be referred to as an unavailability window.

AOS (Acquisition of Signal (or Satellite))

This means a start time at which communication between a satellite station and a specific earth station becomes available by the arrival of the satellite station at a position inside a visible range of the specific earth station. Strictly speaking, an actual start of the communication corresponds to a time point at which, for example, the elevation angle of the satellite as viewed from a point on the ground after the AOS has sufficiently been increased.

LOS (Loss of Signal (or Satellite))

In contrast to the AOS, this means an end time at which the communication is ended by the arrival of the satellite station at a position outside the visible range of the earth station.

MCS (Mission Control Software)

This means software for performing mission control (data transmission/reception and supervisory control) of a satellite station.

ITU (International Telecommunication Union)

This is a United Nations specialized agency that contributes to the formation of an international order related to the use of telecommunications (wired communication and wireless communication).

TLE (Two-Line Element set)

This is a format for representing orbit information regarding a satellite station, or the orbit information itself.

<1. Entire Configuration>

Figure 2:
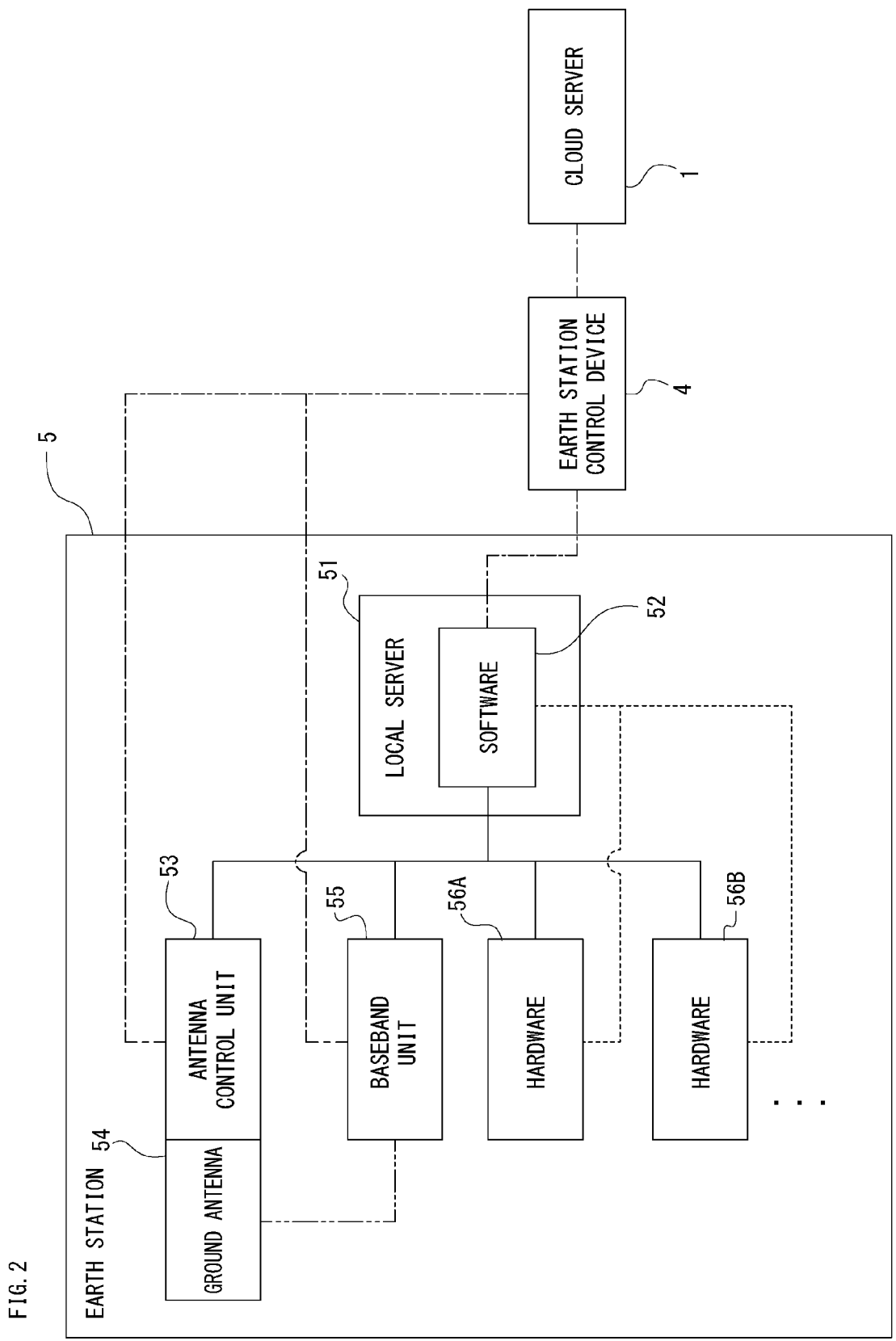
FIG. 2 is a diagram illustrating relations between an earth station, an earth station control device, and a cloud server.

A network system in the present embodiment will be described with reference to FIGS. 1 and 2. FIG. 1 is a diagram illustrating an entire configuration of the network system, including a platform. Further, FIG. 2 is a diagram illustrating relations between an earth station, an earth station control device, and a cloud server.

In the network system, a cloud server 1 is mutually communicably connected to an operation monitoring terminal 2, user terminals 3, earth station control devices 4 via a network (see FIG. 1). The network is implemented by a public communication link such as the Internet.

Further, earth stations 5 that can communicate with satellite stations 6 are connected to the cloud server 1 via the respective earth station control devices 4.

Note that the earth stations 5 may directly be connected to the cloud server 1 not via the earth station control devices 4.

According to the network system of the present technology, for example, a ground antenna business proprietor is able to perform scheduling of duration times during which the business proprietor is to lend an earth station 5 operated by the business proprietor itself to another satellite business proprietor, and duration times that the business proprietor is to save for its own uses, and a satellite business proprietor is able to confirm duration times of communicable earth stations 5 and reserve or cancel such a duration time.

Each of the user terminals 3 is terminal equipment used by a user that uses the cloud server 1, and is computer equipment, a terminal, or the like, such as a PC (Personal Computer), a smartphone, or a tablet terminal, which includes a communication function for connecting to, for example, the Internet. The user is, for example, a satellite business proprietor, a ground antenna business proprietor, or an entity serving as both the satellite business proprietor and the ground antenna business proprietor.

In the network system provided by the cloud server 1, the ground antenna business proprietor performs, by using its owned user terminal 3, scheduling of during times during which the business proprietor lends its owned earth station 5 to another satellite business proprietor and duration times that the business proprietor saves for its own uses, for example.

In the network system provided by the cloud server 1, the satellite business proprietor performs, by using its owned user terminal 3, confirmation of duration times of communicable earth stations 5 and reservation or cancellation of such a duration time, for example.

The user terminal 3 at the satellite business proprietor side is provided with an API (Application Programming Interface), a CLI (Command Line Interface), and a GUI (Graphical User Interface) that are used for reserving a communication reservation period. The CLI means the function of operating to enter an instruction word called a command by using a keyboard, or the operation itself.

Note that the user terminal 3 at the satellite business proprietor side may be provided with any one of the API, the CLI, and the GUI, or any plural ones thereof.

The operation monitoring terminal 2 is terminal equipment used by an operator of the network system, and is a PC or the like that includes the communication function for connecting to, for example, the Internet. The operator performs the management, operation, and the like of the network system by using the operation monitoring terminal 2.

The cloud server 1 interconnects a plurality of earth stations 5 conforming to different technical specifications via the earth station control devices 4, to thereby assign, to a satellite station 6 possessed by a user (satellite business proprietor) that uses the network system, an earth station 5 in which the intention of the user (satellite business proprietor) is reflected.

The cloud server 1 is configured by one or more information processing devices, and includes functions of a period calculation section 11, a reservation management section 12, and a presentation control section 13. Each of the functions of the cloud server 1 is implemented by processing that a CPU (Central Processing Unit) performs according to a program in the one or more information processing devices. Note that, however, the whole or part of processing of the configurations described below may be implemented by hardware.

Further, in the case where the individual functions are implemented by software, the individual functions are not needed to be implemented by mutually independent programs. Processing of a plurality of functions may be performed by one program, or one function may be implemented by cooperation of a plurality of program modules. Further, the individual functions may be distributed to a plurality of information processing devices. Moreover, one of the functions may be implemented by a plurality of information processing devices.

The period calculation section 11 performs processing for calculating a communication available period for communication between a satellite station 6 and an earth station 5 on the basis of orbit information regarding the satellite station 6 and location information regarding the earth station 5.

The reservation management section 12 performs processing for selecting reservation target periods from the communication available periods by performing selection processing according to a selected plan, and reserving a communication reservation period for the communication between the satellite station 6 and the earth station 5 from the selected reservation target periods.

Further, upon receipt of cancel information that is transmitted by an operation at the satellite business proprietor side or an operation at the ground antenna business proprietor side and that is associated with a communication reservation period reserved for communication between a satellite station 6 and an earth station 5, the reservation management section 12 performs processing for cancelling the communication reservation period.

Further, the cloud server 1 can store, on the cloud, information associated with earth stations 5 of ground antenna business proprietors and satellite stations 6 of satellite business proprietors and acquire the stored information.

The presentation control section 13 causes the user terminal 3 to present the reservation target periods selected by the reservation management section 12. The presentation control section 13 also causes the user terminal 3 to display, in addition to the above, various screens in the network system.

The earth station control devices 4 mediate the connection of the earth stations 5 to the cloud server 1 to thereby integrate the plurality of earth stations 5 (see FIG. 2).

The earth stations 5 included in the network system include earth stations 5 conforming to a plurality of technical specifications. The technical specifications include a center frequency, a frequency band, a polarized wave, a modulation method, and an encoding method.

Examples of the center frequency include an UHF (Ultra High Frequency) band, an S band, an X band, a Ka band. Examples of the polarized wave include RHCP (Right-Hand Circular Polarization), LHCP (Left-Handed Circularly Polarized wave), or both thereof. Examples of the modulation method include FSK (Frequency Shift Keying), AFSK (Audio Frequency Shift Keying), GFSK (Gaussian filtered Frequency Shift Keying), MSK (Minimum Phase Shift Keying), GMSK (Gaussian filtered Minimum Phase Shift Keying), PSK (Phase Shift Keying), BPSK (Binary Phase Shift Keying), QPSK (Quadrature Phase Shift Keying), and 64 QAM (64 Quadrature Amplitude Modulation), and further, other various modulation methods can also be applied to the modulation method. Examples of the encoding method include a unipolar NRZ (Non Return to Zero) code, a bipolar NRZ code, a unipolar RZ (Return to zero) code, a bipolar RZ code, and AMI (Alternate Mark Inversion), and further, other various coding methods can also be applied to the encoding method. For example, as an error correction code, a Reed-Solomon code, a turbo code, a convolution code, and the like can also be applied to the encoding method.

The earth station control devices 4 include drivers corresponding to respective pieces of hardware installed at the earth stations 5 side, and control the earth stations 5 on the basis of the drivers. Each of the earth station control devices 4 includes a plurality of drivers, and a suitable driver is selected according to the earth station 5.

Further, the control of such drivers in each of the earth station control devices 4 may be performed by a hardware circuit or may be performed by a software program.

The earth station control devices 4 are each capable of preparing, at any time, drivers corresponding to the respective pieces of hardware of the earth stations 5 conforming to the plurality of technical specifications, making it possible to integrate the earth stations 5 having various hardware configurations. For example, the earth station control devices 4 each include individual interfaces with a local server 51 and software 52 included in the local server 51, which will be described later.

Further, the earth station control devices 4 are each connected to the corresponding earth station 5 to perform control of the earth station 5 and satellite data processing therefor. Examples of the control of the earth station 5 performed by the earth station control device 4 include, but are not limited to, control of the hardware of the earth station 5, relay of satellite data between a satellite and a satellite business proprietor, acquisition of log data regarding the earth station 5, synchronization of pass schedules (information regarding communication reservation periods) between the earth station 5 and the cloud server 1. The earth station control device 4 performs the control of the hardware of the earth station and the relay of the satellite data on the basis of the pass schedules.

As the satellite data processing, the earth station control device 4 performs modulation/demodulation processing, encoding processing, and the like on telemetry data or command data regarding the satellite station 6.

Further, in order to reduce the latency (enhance the latency), the earth station control device 4 performs control so as to cause the earth station 5 to be connected to an optimum data center existing near the location of a ground antenna 54 of the earth station 5, which will be described later.

Note that the earth station 5 may directly be connected to the cloud server 1 not via the earth station control device 4, and the cloud server 1 may perform the processing described above.

The earth station 5 is installed on the ground of the earth, and performs communication by propagating radio waves between its own ground antenna and a satellite antenna of a satellite station 6 orbiting the center of the earth substantially as the center of its orbit, while causing the ground antenna to track the satellite station 6.

The earth station 5 includes the local server 51, the software 52, an antenna control unit 53, the ground antenna 54, and a baseband unit 55.

The local server 51 controls the antenna control unit 53, the baseband unit 55, and a plurality of kinds of hardware 56A, 56B, . . . , and other components. Each of pieces of hardware is indirectly controlled by a program of the software 52 included in the local server 51. Note that each of the pieces of hardware may be directly controlled by a hardware circuit of the local server 51.

Further, the local server 51 synchronizes the pass schedule of the cloud server 1 with the pass schedule of the earth station 5. The earth station 5 tracks the satellite station 6 on the basis of the synchronized pass schedule to perform communication with the satellite station 6.

Note that the local server 51 acquires pass schedule information from the cloud server 1 via the earth station control device 4, but is also capable of directly receiving the pass schedule information from the cloud server 1.

The antenna control unit (ACU) 53 controls pointing of the ground antenna 54. The pointing of the ground antenna 54 means operation of directing the ground antenna 54 toward a satellite station 6 targeted for communication in order to allow the earth station 5 to communicate with the satellite station 6.

For the control of the pointing, there are two cases, one being a case where the control is performed on the basis of orbit information received by the antenna control unit 53, the other one being a case where the control is performed upon receipt of a pointing instruction that the cloud server 1 has issued on the basis of the orbit information.

The baseband unit (BBU) 55 controls modulation, demodulation, and encoding at the time of the transmission of information. The baseband unit 55 converts analog signals transmitted/received as radio waves to/from the antenna into electronic signals. Further, the baseband unit 55 also converts electronic signals into analog signals.

The baseband unit 55 receives satellite data that the ground antenna 54 has received from the satellite station 6, and directly transmit the satellite data to the earth station control device 4. Further, the earth station control device 4 transmits command information from the cloud server 1 to the ground antenna 54 via the baseband unit 55, and the command information is transmitted from the ground antenna 54 to the satellite station 6.

Note that the earth station control device 4 may directly receive the satellite data, which has been received from the satellite station 6 by the ground antenna 54, from the ground antenna 54 not via the baseband unit 55. Further, the earth station control device 4 may directly transmit the command information from the cloud server 1, to the ground antenna 54 not via the baseband unit 55.

The earth station 5 includes, in addition to the above, the plurality of kinds of hardware 56A, 56B, . . . according to the specification of the earth stations 5, and various functions according to the respective kinds of hardware are implemented.

Note that the pieces of hardware of the antenna control unit 53, the baseband unit 55, the pieces of hardware 56A, 56B, . . . , and other components are controlled by the local server 51, but can be directly controlled by the earth station control device 4 by utilizing the various kinds of drivers provided in the earth station control device 4 and connecting the drivers to the pieces of hardware.

As for the plurality of earth stations 5 in the network system, the hardware and software configurations inside the earth stations 5 are different from one another, and thus, the method of controlling each of the pieces of hardware can be selected from the indirect control via the local server 51 and the direct control by the earth station control device 4, according to the configuration of each of the earth stations 5.

Figure 3:
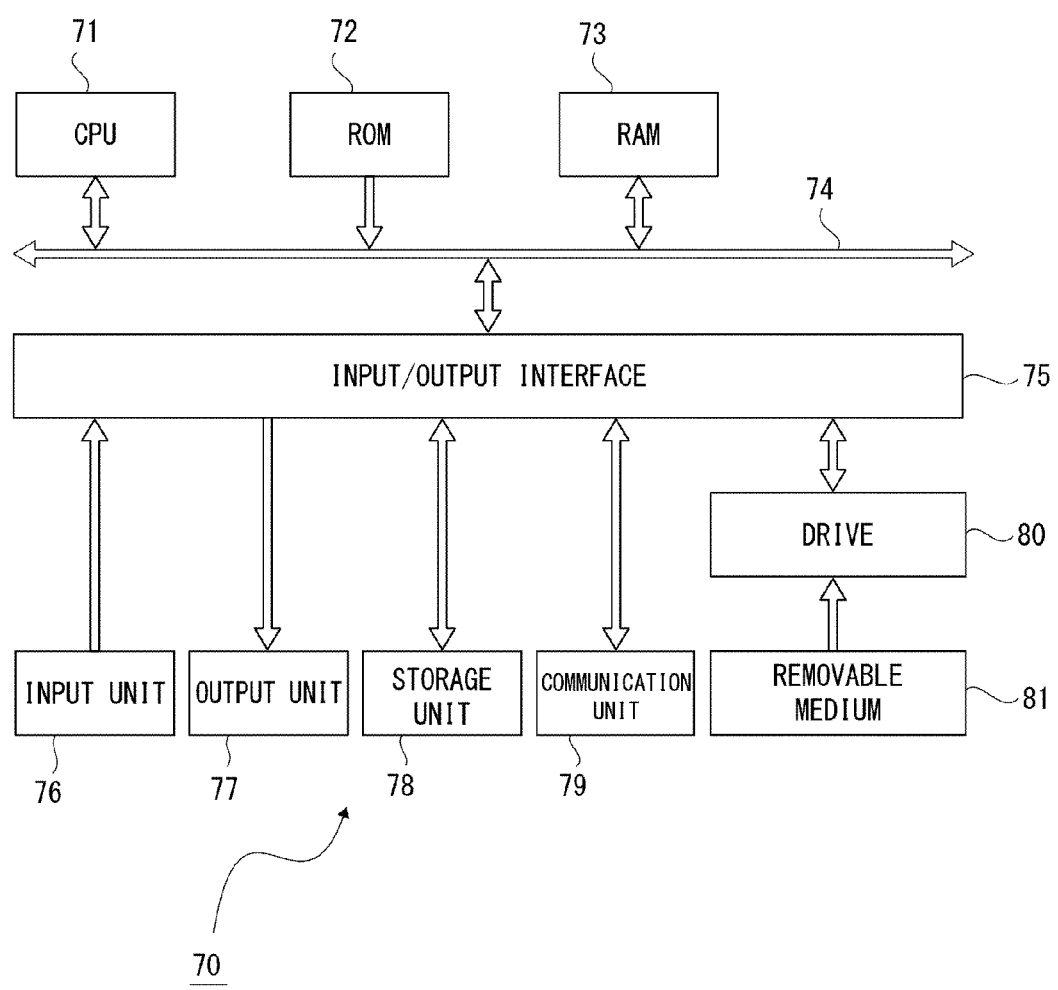
FIG. 3 is a diagram that describes a hardware configuration of an embodiment.

FIG. 3 illustrates a hardware configuration of an information processing device 70 configuring the cloud server 1, the operation monitoring terminal 2, the user terminals 3, the earth station control devices 4, and the local servers 51. Devices indicated as the cloud server 1, the operation monitoring terminal 2, the user terminals 3, the earth station control devices 4, and the local servers 51 can each be implemented as a computer device, as illustrated in FIG. 3, which is capable of performing information processing and information communication.

In FIG. 3, a CPU 71 of the computer device performs various kinds of processing according to a program stored in a ROM (Read Only Memory) 72 or a program loaded from a storage unit 78 into a RAM (Random Access Memory) 73. Further, data that the CPU 71 needs in the execution of the various kinds of processing, and like data are also stored in the RAM 73 as appropriate.

The CPU 71, the ROM 72, the RAM 73 are connected to one another via a bus 74. An input/output interface 75 is also connected to the bus 74.

The input/output interface 75 is connected to an input unit 76 including a keyboard, a mouse, a touch panel, and any other input component; an output unit 77 including a display implemented by an LCD (Liquid Crystal Display), a CRT (Cathode Ray Tube), an organic EL (Electroluminescence) panel, or any other kind of display, a speaker, and any other output component; the storage unit 78 including an HDD (Hard Disk Drive), a flash memory device, and any other kind of storage component; and a communication unit 79 that performs communication processing via a network and inter-equipment communication.

The input/output interface 75 is also connected as needed to a drive 80, to which a removable medium 81 such as a magnetic disk, an optical disk, a magneto-optical disk, a semiconductor memory, or any other kind of removable medium is attached as needed, to allow reading/writing of information from/to the removable medium 81 to be performed.

In such a computer device, uploading and downloading of data and programs can be performed by means of communication by the communication unit 79, and transferring and receiving of data and programs can be performed via the removable medium 81.

Processing operation that the CPU 71 performs on the basis of various programs allows information processing and communication needed as the cloud server 1, the operation monitoring terminal 2, the user terminal 3, the earth station control device 4, and the local server 51 to be performed.

Here, the information processing device configuring the cloud server 1, the operation monitoring terminal 2, the user terminals 3, the earth station control devices 4, and the local servers 51 is not limited to such a configuration in which a single computer device as illustrated in FIG. 3 is implemented, and may be configured by systemizing a plurality of computer devices. The plurality of computer devices may be systemized by using a LAN (Local Area Network) or the like, or may be located at individual remote locations in a communication available state by using a VPN (Virtual Private Network) or any other similar kind of network, which uses the Internet or the like. The plurality of information processing devices may include information processing devices serving as a server group (cloud) usable by cloud computing services.

<2. Presentation Forms in User Terminal>

Hereinafter, presentation forms in the user terminal 3 at the time when a user utilizes the network system by using the user terminal 3 will be described.

[2-1. Schedule Coordination at Ground Antenna Business Proprietor Side]

First, examples of a screen presented on the user terminal 3 at the time when a user as a ground antenna business proprietor coordinates the schedules of its owned earth stations 5 by using the network system will be described with reference to FIGS. 4 to 7.

Figure 4:
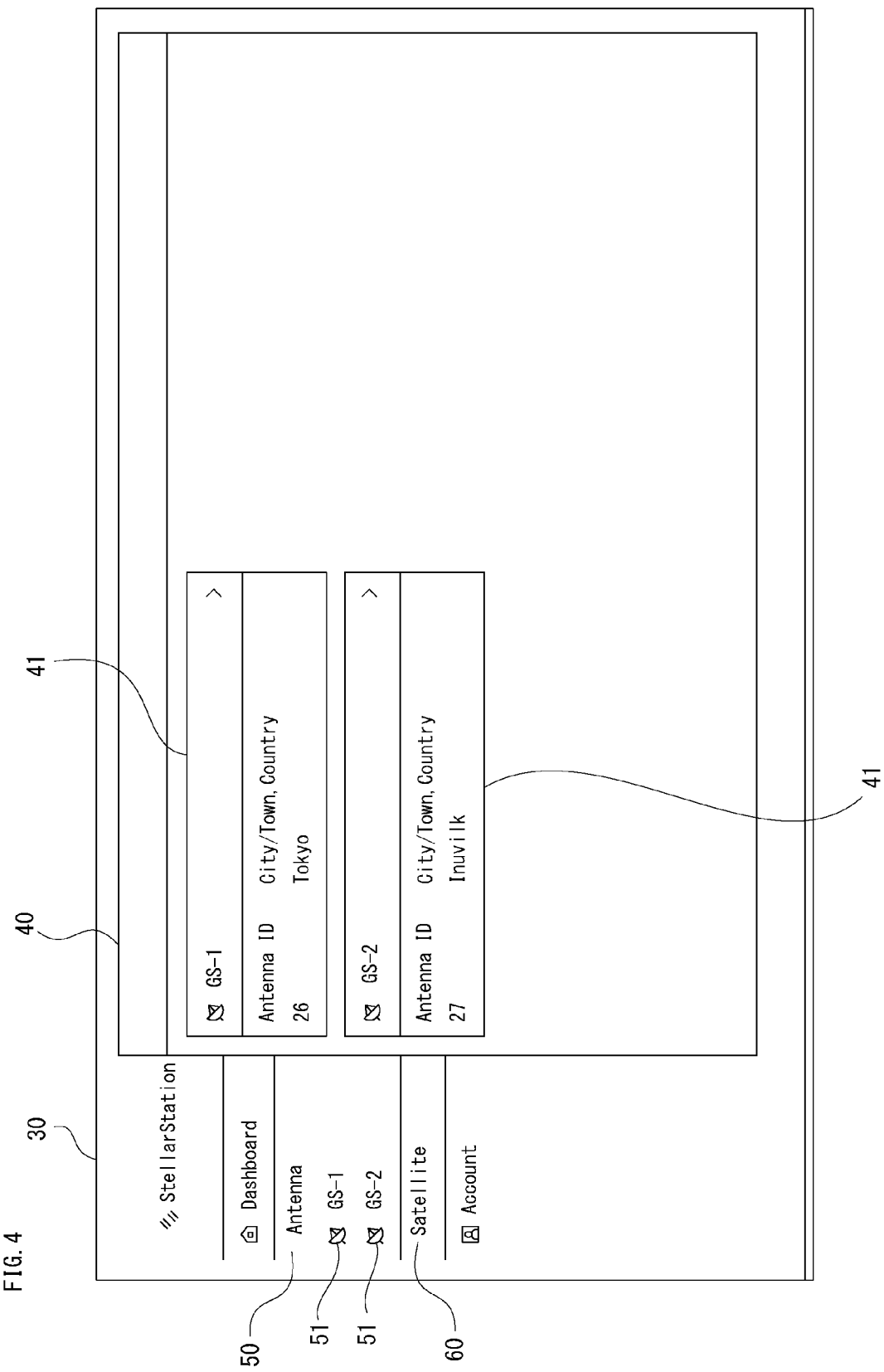
FIG. 4 is a diagram illustrating a screen for presenting earth stations possessed by a ground antenna business proprietor.
Figure 5:
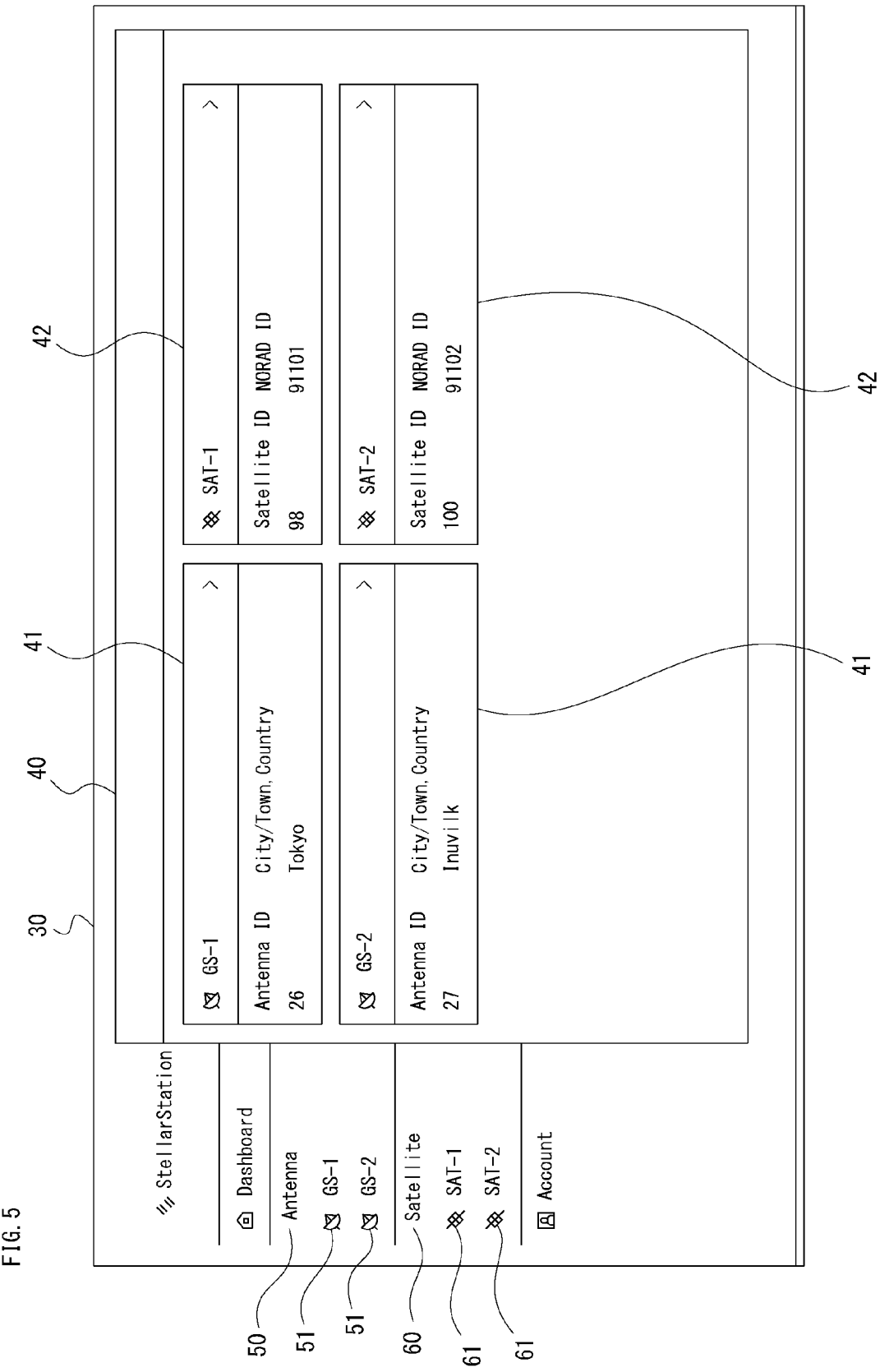
FIG. 5 is a diagram illustrating a screen for presenting earth stations and satellite stations possessed by a ground antenna business proprietor.
Figure 6:
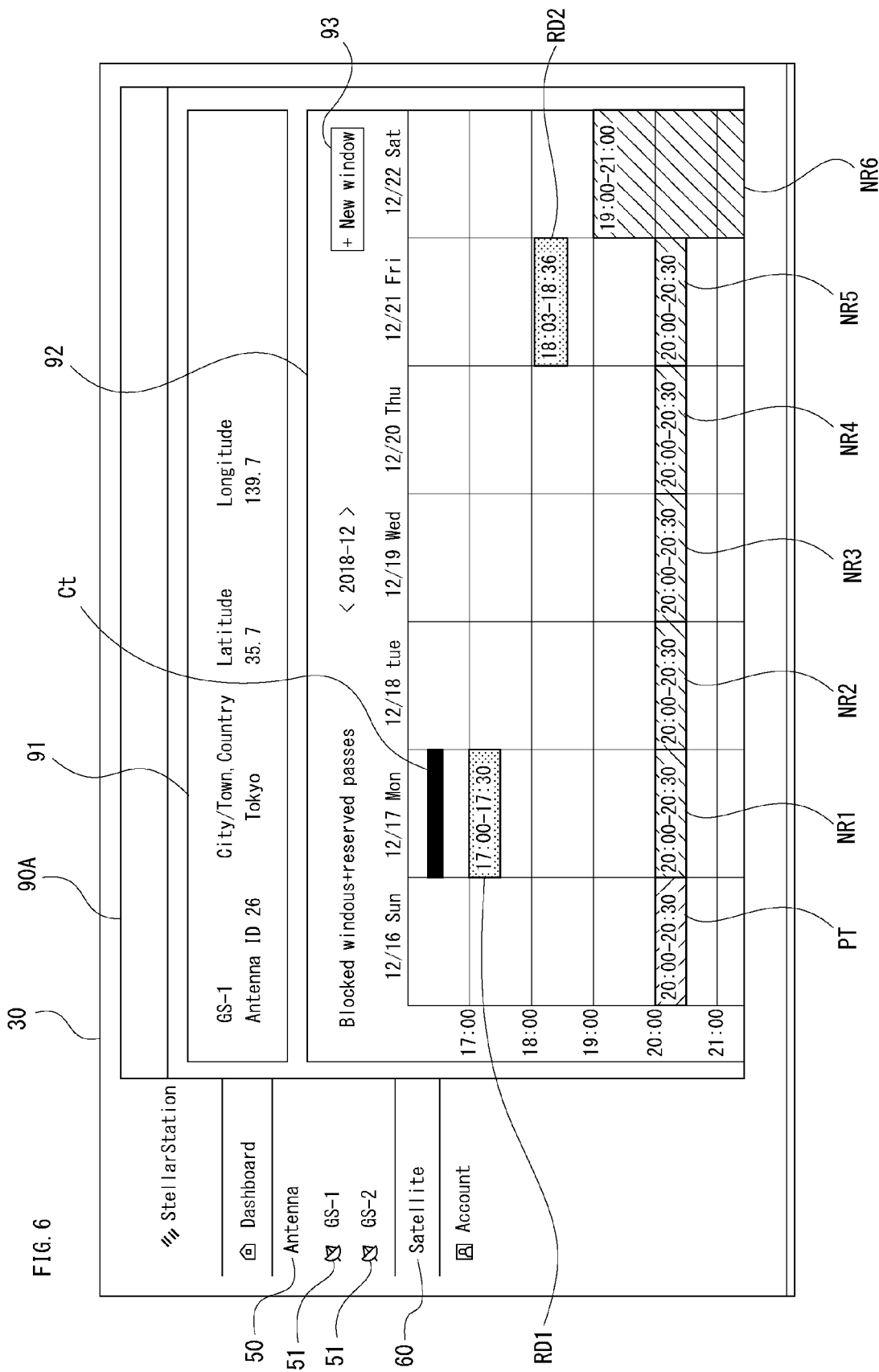
FIG. 6 is a diagram illustrating a schedule screen for an earth station possessed by a ground antenna business proprietor.
Figure 7:
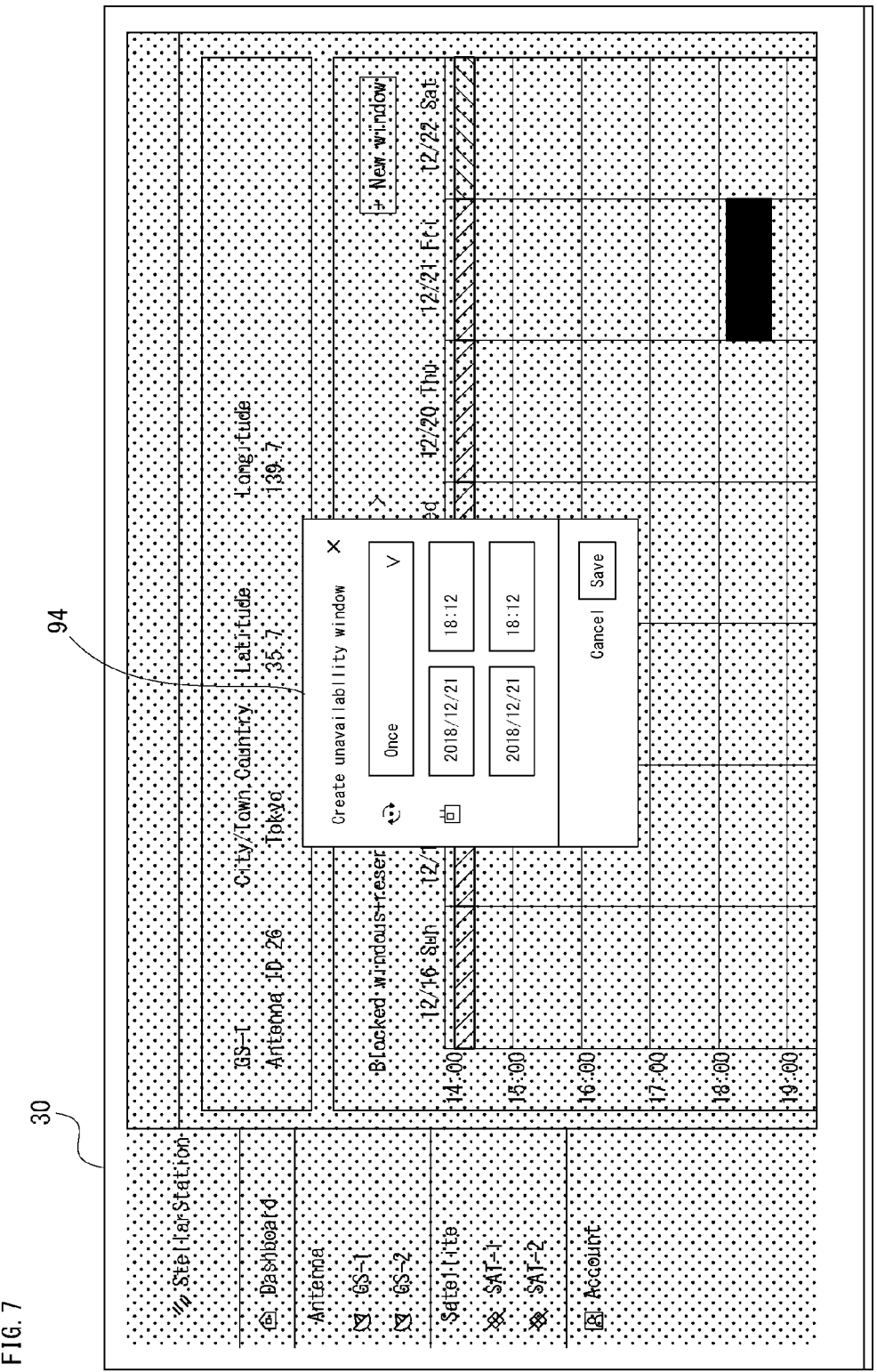
FIG. 7 is a diagram illustrating a setting screen for setting a usage limited period in the schedule screen at the ground antenna business proprietor side.

FIGS. 4 and 5 illustrate screens presenting the earth stations 5 possessed by the ground antenna business proprietor and satellite stations 6. FIG. 6 illustrates a schedule screen for an earth station 5 possessed by the ground antenna business proprietor. FIG. 7 illustrates a setting screen for a usage limited period in the schedule screen at the ground antenna business proprietor side.

Upon log-in by the user as the ground antenna business proprietor into the network system provided by the cloud server 1, a list display screen 30 is displayed on the user terminal 3 (see FIG. 4). Information regarding the earth stations 5 possessed by the user and a satellite station 6 is presented on the list display screen 30.

The list display screen 30 includes a station information display region 40, an earth station selection region 50, and a satellite station selection region 60.

Information regarding an earth station 5 possessed by the user (ground antenna business proprietor) is displayed in each of display regions 41, 41 of the station information display region 40. The display regions 41 are displayed according to the number of earth stations 5 possessed by the user (ground antenna business proprietor).

In FIG. 4, as an example, pieces of information regarding the earth stations GS-1 and GS-2 as the earth stations 5 possessed by the user (ground antenna business proprietor) are displayed in the respective display regions 41, 41.

In each of the display regions 41, pieces of information regarding the name of the corresponding earth station 5, such as "GS-1" or "GS-2," the ID (Identification) (Antenna ID) of a corresponding ground antenna, the area (City/Town, Country) where the corresponding earth station 5 is located, and like attribute are displayed.

Note that the user (ground antenna business proprietor) sometimes possesses not only the earth stations 5 but also satellite stations 6. In this case, pieces of information regarding the satellite stations 6 possessed by the user (ground antenna business proprietor) are displayed in display regions 42, 42 (see FIG. 5).

In FIG. 5, as an example, pieces of information regarding a satellite station SAT-1 and a satellite station SAT-2 are displayed in the respective display regions 42, 42, as the satellite stations 6 possessed by the user (ground antenna business proprietor). The display regions 42 are displayed according to the number of satellite stations 6 possessed by the user (ground antenna business proprietor).

In each of the display regions 42, the name of the corresponding satellite station 6, such as "SAT-1" or "SAT-2," the ID (Satellite ID) of the corresponding satellite station 6, the NORAD (North American Aerospace Defense Command) ID, and like attribute are displayed.

In the display region 41 and the display region 42, in addition to the above, information regarding a success or a failure of communication, an alert such as a defect of communication equipment, a contact from a network administrator side, and any other kind of information are displayed in the form of a list so as to enable the user to recognize, at a glance, the current statuses of the earth stations 5 and the satellite stations 6 possessed by the user.

In the earth station selection region 50, selection regions 51, 51 each of which enables selection of the corresponding one of the earth stations 5 possessed by the user (ground antenna business proprietor) are displayed. Upon selection of the selection region 51 through an operation of the user terminal 3 by the user (ground antenna business proprietor), as illustrated in FIG. 6, a schedule screen 90A for the selected earth station 5 is displayed in a display region of the station information display region 40.

For example, in FIG. 4, "GS-1" and "GS-2" as the possessed earth stations 5 are displayed in the selection regions 51, 51, and upon selection of the selection region 51 corresponding to the "GS-1," the schedule screen 90A for the earth station GS-1 is displayed as illustrated in FIG. 6.

In the schedule screen 90A, information regarding an earth station 5 possessed by the user is displayed in a display region 91, and the current schedule list for the earth station 5 is displayed in a display region 92 (see FIG. 6). In FIG. 6, information regarding the earth station GS-1 selected in the selection region 51 is displayed in the display region 91, and the schedule list for the earth station GS-1 is displayed in the display region 92.

In the schedule list, the horizontal axis indicates dates and the vertical axis indicates clock times. In the schedule list, communication reservation periods RD1 and RD2 set as periods during which the ground antenna is to be lent to any other user (satellite business proprietor) and usage limited periods NR1 to NR6 set as periods during which the ground antenna is not permitted to be lent to any other user (satellite business proprietor) are displayed.

Further, a clock time line Ct indicating the current clock time is displayed, and periods, such as a communication reservation period and a usage limited period, which are displayed before the clock time line Ct (i.e., already-elapsed periods) are each displayed as an elapsed period PT.

For example, the communication reservation period RD, the usage limited period NR, the elapsed period PT are indicated in mutually different colors, and this enables the user (ground antenna business proprietor) to visually recognize the schedule of its owned earth station 5. Note that a communication reservation period, a usage limited period, and any other period that are indicated as the elapsed periods PT can also be mutually distinguished from each other by using different colors.

Upon selection of a custom button 93 in the display region 92 through an operation of the user terminal 3 by the user (ground antenna business proprietor), a setting screen 94 is displayed (see FIG. 7). In the setting screen 94, the user (ground antenna business proprietor) is able to set or change the setting of a usage limited period NR by operating the user terminal 3.

Further, in the setting screen 94, the user (ground antenna business proprietor) is able to, by operating the user terminal 3, cancel a communication reservation period RD that is currently reserved by another user (satellite business proprietor) (the communication reservation period RD being a period during which the ground antenna business proprietor is to lend the ground antenna to the satellite business proprietor) from the ground antenna business proprietor side.

Referring back to FIG. 4, in the case where the user (ground antenna business proprietor) possesses a satellite station 6, an item regarding the possessed satellite station 6 is displayed in the satellite station selection region 60. In FIG. 4, since the user (ground antenna business proprietor) possesses no satellite station 6, no item regarding the satellite station 6 is displayed in the satellite station selection region 60.

On the other hand, in the case where the user (ground antenna business proprietor) possesses satellite stations 6 as illustrated in FIG. 5, the selection regions 61, 61 are provided in the satellite station selection region 60, and the individual possessed satellite stations 6 are displaced therein. In FIG. 5, "SAT-1" and "SAT-2" are displayed in the selection regions 61, 61 as the possessed satellite stations 6.

Figure 12:
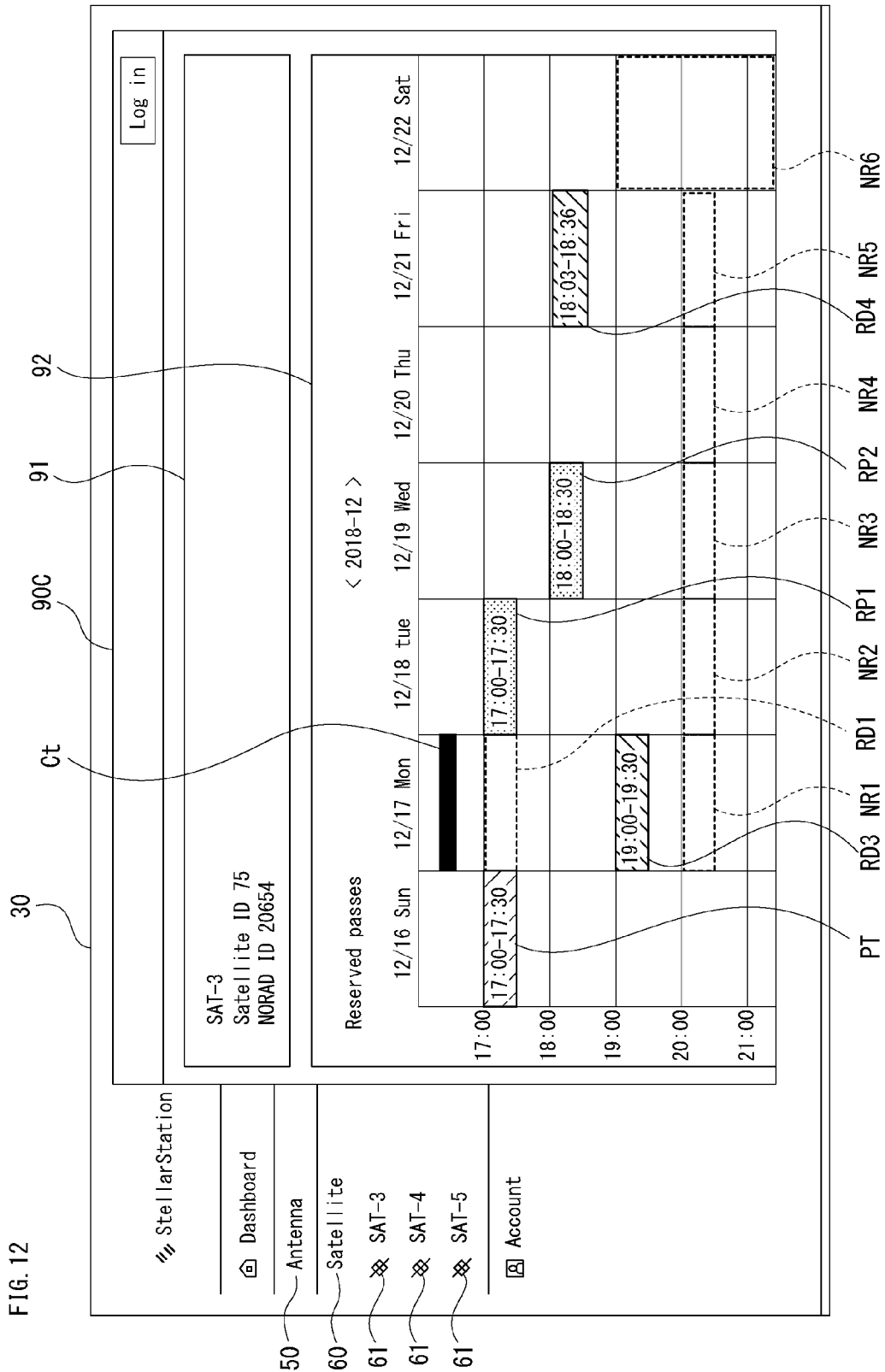
FIG. 12 is a diagram illustrating a modification example of the schedule screen for a satellite station possessed by a satellite business proprietor.

Upon selection of one of the selection regions 61 through an operation of the user terminal 3 by the user (ground antenna business proprietor), as illustrated in FIGS. 9 and 12 to be described later, a schedule screen 90 (90B or 90C) regarding the selected satellite station 6 is displayed in the list display screen 30. The details of setting of a communication reservation period on the schedule screen will be described later.

[2-2. Schedule Coordination at the Satellite Business Proprietor Side]

Next, examples of a screen that is presented on the user terminal 3 at the time when a user as a satellite business proprietor coordinates the schedule regarding the communication of its owned satellite station 6 by using the network system will be described with reference to FIGS. 8 to 11.

Note that configurations similar to those in the above-described screens presented on the user terminal 3 at the ground antenna business proprietor side will be denoted by the same reference signs as those of the configurations of the above-described screens, and will be omitted from the following description.

Figure 8:
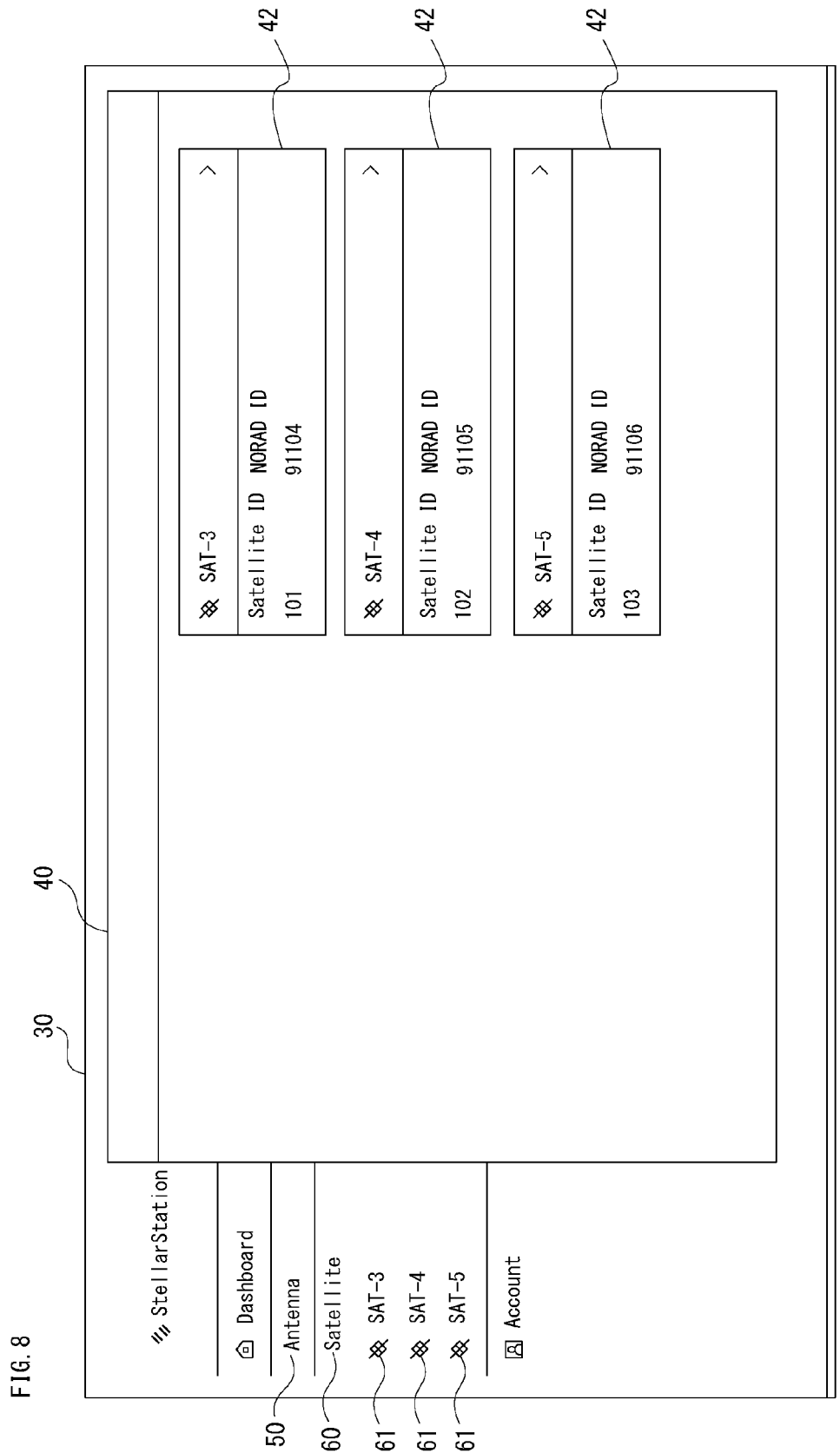
FIG. 8 is a diagram illustrating a presentation screen for presenting satellite stations possessed by a satellite business proprietor.
Figure 10:
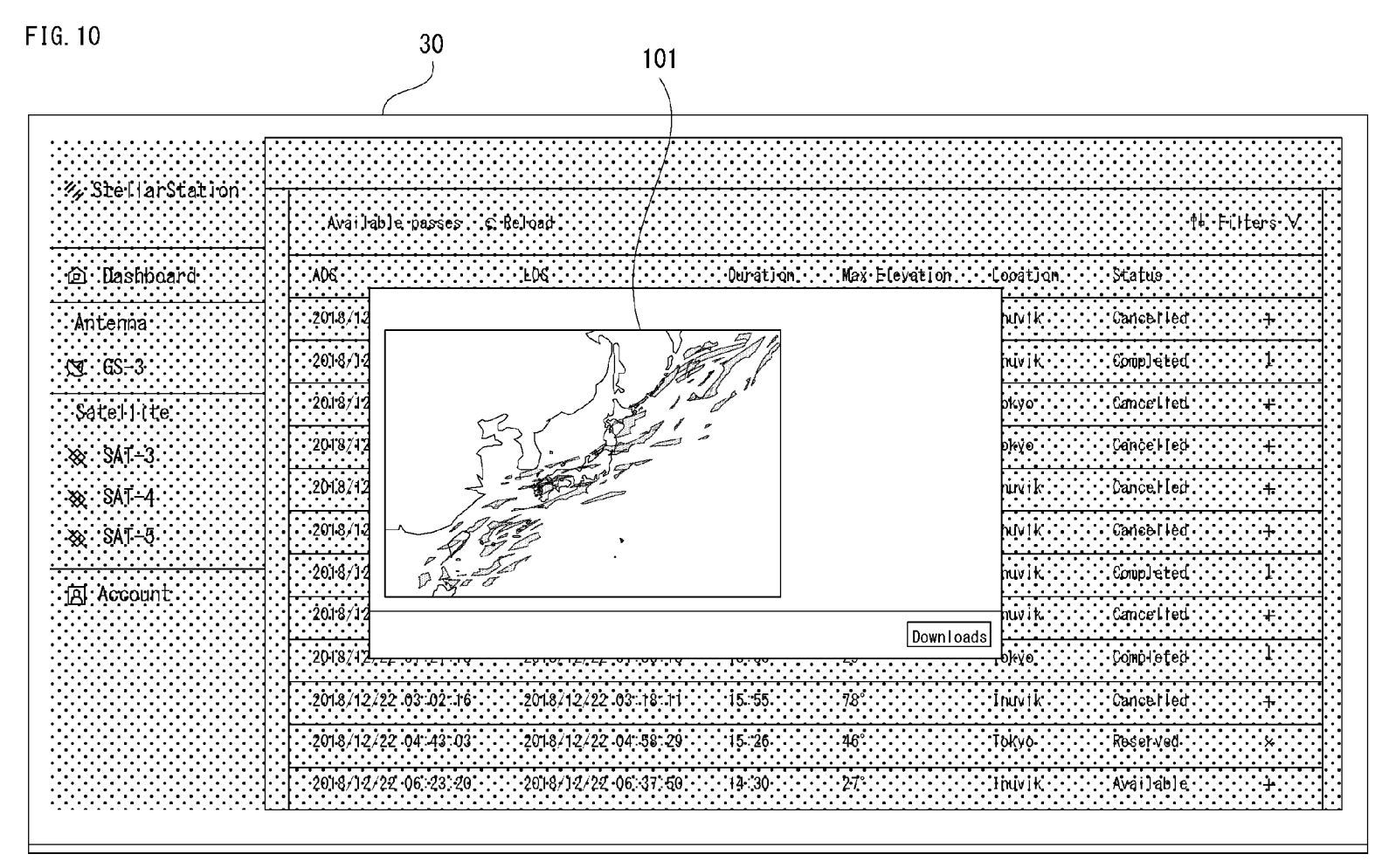
Figure 11:
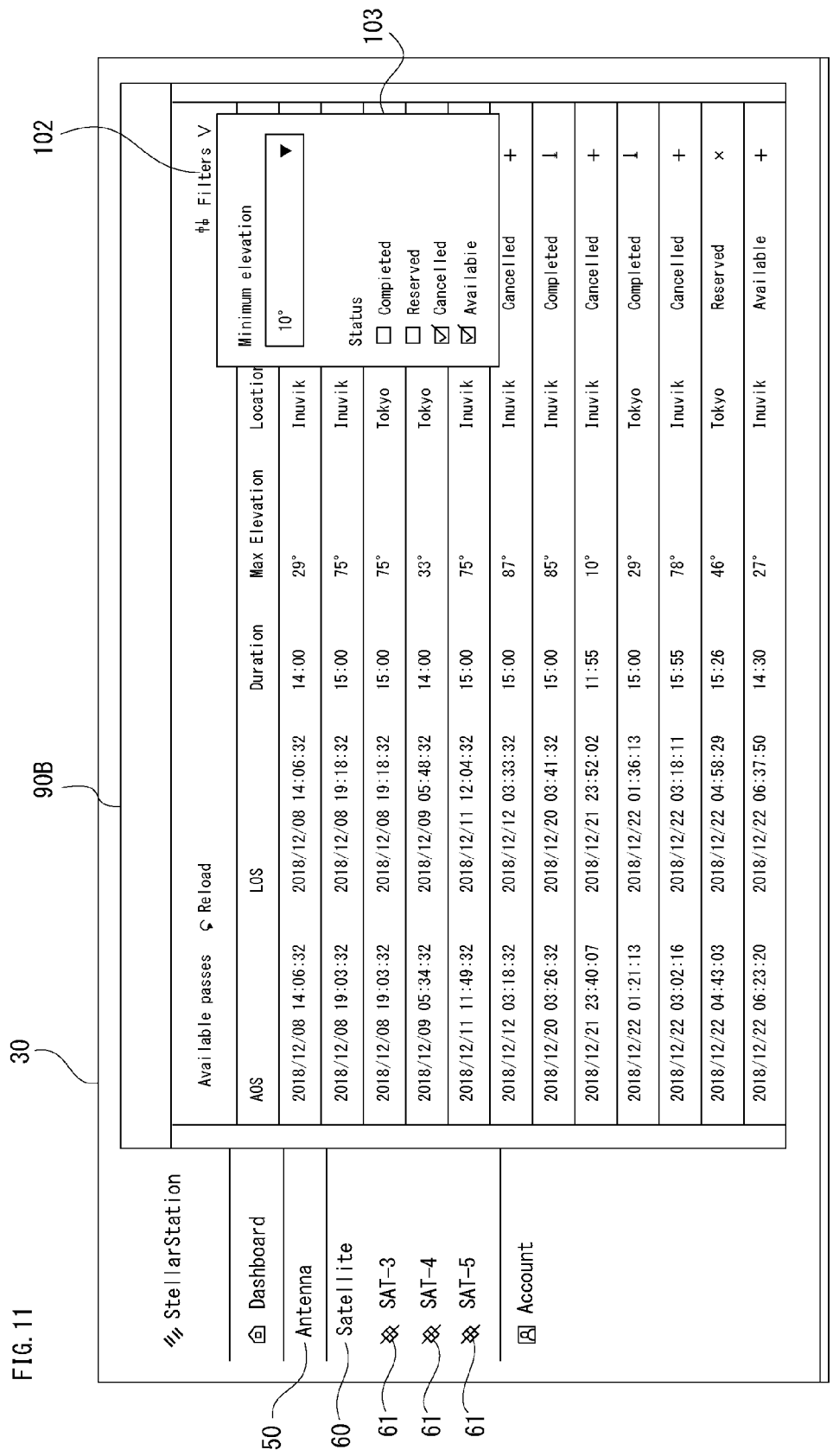
FIG. 11 is a diagram illustrating a sort screen in the schedule screen for a satellite station.

FIG. 8 illustrates a screen for presenting earth stations 5 and satellite stations 6 that are possessed by a satellite business proprietor. FIG. 9 illustrates a schedule screen for a satellite station 6 possessed by the satellite business proprietor. FIG. 10 illustrates a display screen for image data that an earth station 5 has obtained through communication with a satellite station 6. FIG. 11 illustrates a sort screen in the schedule screen for the satellite station 6.

Upon log-in by a user as the satellite business proprietor into the network system provided by the cloud server 1, the list display screen 30 is presented on the user terminal 3 (see FIG. 8).

The list display screen 30 includes the station information display region 40, the earth station selection region 50, and the satellite station selection region 60.

Pieces of information regarding the satellite stations 6 possessed by the user (satellite business proprietor) are displayed in the respective display regions 42, 42, 42 in the station information display region 40. The display regions 42 are displayed according to the number of satellite stations 6 possessed by the user (satellite business proprietor).

In FIG. 8, as an example, pieces of information regarding satellite stations SAT-3, SAT-4, and SAT-5 as the satellite stations 6 possessed by the user (satellite business proprietor) are displayed in the respective display regions 42, 42, 42.

In each of the display regions 42, the name of the corresponding satellite station 6, such as "SAT-3," "SAT-4," or "SAT-5," the ID (Satellite ID) of the corresponding satellite station 6, a NORAD ID, and like attribute are displayed.

Note that the user (satellite business proprietor) sometimes possesses not only the satellite stations 6 but also earth stations 5, and in such a case, as having been illustrated in FIG. 5, pieces of information regarding the earth stations 5 possessed by the user (satellite business proprietor) are displayed in the display region 41.

Referring back to FIG. 8, in the satellite station selection region 60, selection regions 61, 61, 61 each of which enables selection of the corresponding one of the satellite stations 6 possessed by the user (satellite business proprietor) are displayed.

Upon selection of one of the selection regions 61 through an operation of the user terminal 3 by the user (satellite business proprietor), a schedule screen 90B for the selected satellite station 6 is displayed in a display region of the station information display region 40, as illustrated in FIG. 9.

For example, in FIG. 8, as the possessed satellite stations 6, "SAT-3," "SAT-4," and "SAT-5" are displayed in the respective selection regions 61, 61, 61 and upon selection of the selection region 61 for "SAT-3," the schedule screen 90B for the satellite station SAT-3 is displayed as illustrated in FIG. 9.

In the schedule screen 90B, for each of earth stations 5 of other users (ground antenna business proprietors), pieces of information such as clock times of an AOS and an LOS, a communication duration time (Duration) derived from the AOS and the LOS, a maximum elevation angle (Max Elevation), an installed location (Location), and a status (Status) are displayed. Further, an earth station owner can also be displayed for each of the earth stations 5, but is intentionally omitted from the illustration of the schedule screen 90B.

The status encompasses, for example, a state in which communication has been completed (Completed), a state in which communication has not been performed during a communication reservation period (Cancelled), a state in which communication with its owned satellite station 6 has been reserved (Reserved), and a state in which a reservation of communication with its owned satellite station 6 is available (Available), and in the case where the status of an earth station 5 is "Available," the user is able to reserve communication with the earth station 5 as a communication reservation period. That is, a period for which the status is "Available" is a reservation target period.

The user (satellite business proprietor) is able to view, for each of its owned satellite stations 6, reservation target periods and statuses regarding individual earth stations 5. The user (satellite business proprietor) is able to set (reserve), as a communication reservation period, a reservation target period regarding the earth station 5 that matches its own desire.

When setting a communication reservation period, the satellite business proprietor is able to select a plan (condition specification reservation plan) in which the business proprietor specifies conditions such as time and an area, and on the basis of the specified conditions, a communication reservation period is automatically reserved from reservation target periods, or a plan (on-demand reservation plan) in which the business proprietor reserves a communication reservation period that the business proprietor has selected according to its own desire while viewing the schedule screen 90B. The details of the condition specification reservation plan and the on-demand reservation plan will be described later.

In the schedule screen 90B, a data display button VW is displayed with respect to an item whose status has become a status in which communication has been completed (the status being "Completed"). When the user (satellite business proprietor) selects the data display button VW though an operation of the user terminal 3, for example, an image is displayed which has been generated on the basis of IQ data (Raw data) that the corresponding earth station 5 has received from the satellite station 6 through communication therewith.

For example, in FIG. 9, upon selection of a data display button VW, a communication data display screen 101 as illustrated in FIG. 10 is displayed on the list display screen 30. The user (satellite business proprietor) is able to download the image displayed in the communication data display screen 101.

Further, in the schedule screen 90B illustrated in FIG. 9, the user (satellite business proprietor) is able to rearrange the reservation target periods and statuses regarding the individual earth stations 5 according to the statuses or the like regarding the individual earth stations 5.

Upon selection of a sort button 102 in the schedule screen 90B by an operation of the user terminal 3 by the user (satellite business proprietor), a sort screen 103 as illustrated in FIG. 11 is displayed.

Input fields for a minimum elevation angle (Minimum elevation) and a status (Status) are provided in the sort screen 103, and inputs by the user (satellite business proprietor) with respect to conditions such as a minimum elevation angle and a status makes it possible to rearrange or narrow down the individual passes displayed in the schedule screen 90B.

Note that the use of input fields makes it possible to rearrange and narrow down the earth stations 5 on the basis of, not only the minimum elevation (Minimum elevation) and the status (Status), but also other various conditions such as a communication duration time (Duration) and an installed location (Location).

Here, another example of the screen that is presented on the user terminal 3 at the time when the user as the satellite business proprietor coordinates the schedule regarding the communication of its owned satellite station 6 by using the network system will be described with reference to FIG. 12. FIG. 12 illustrates a modification example of the schedule screen for the satellite station 6 possessed by the satellite business proprietor.

In a schedule screen 90C displayed on the list display screen 30 in FIG. 12, information regarding a satellite station 6 possessed and selected by the user (satellite business proprietor) is displayed in the display region 91, and the current schedule list of the selected satellite station 6 is displayed in the display region 92. Here, a schedule list regarding the satellite station SAT-3 selected by the user (satellite business proprietor) is displayed.

In the schedule list, the horizontal axis indicates dates and the vertical axis indicates clock times, and communication reservation periods RD3 and RD4 that are periods for which reservation of the usage of the earth station 5 by the user (satellite business proprietor) has been completed are displayed. Further, in the schedule list, reservation target periods RP1 and RP2 that are periods from which the user (satellite business proprietor) is able to reserve one or more as communication reservation periods are displayed.

Moreover, a clock time line Ct indicating the current clock time is displayed, and periods displayed before the clock time line Ct (i.e., already-elapsed periods) are each displayed as an elapsed period PT.

For example, the communication reservation period RD, the reservation target period RP, and the elapsed period PT are indicated in mutually different colors, and this enables the user (satellite business proprietor) to visually recognize the schedule of its owned satellite station 6. Note that a communication reservation period, a reservation target period, and any other period that are indicated as the elapsed periods PT can also be distinguished from each other by using mutually different colors.

On the other hand, the usage limited periods NR1 to NR6 that are periods during which the usage of the earth station 5 is limited by the ground antenna business proprietor side and the period RD1 that has already been reserved as a communication reservation period by another user are not displayed in the schedule list.

For example, in the case where, for the earth station GS-1, the user (ground antenna business proprietor) illustrated in FIG. 6 has already set the usage limited periods NR1 to NR6, periods corresponding to the usage limited periods NR1 to NR6 are not displayed in the schedule list, illustrated in FIG. 12, for the user (satellite business proprietor).

Further, the communication reservation period RD1, which has already been reserved by another satellite business proprietor, is not displayed in the schedule list for the user (satellite business proprietor) that possesses the satellite station SAT-3.

In this manner, periods that the user (satellite business proprietor) of the selected satellite station 6 is unable to reserve are not displayed from the beginning, so that the user (satellite business proprietor) can easily recognize reservation target periods RP from which reservation can be made.

<3. Matching Between Ground Station and Satellite Station>

Hereinafter, matching between a ground station 5 and a satellite station 6 in the present technology will be described with reference to FIGS. 13 to 16. Performing the matching makes it possible to select and assign an optimum earth station 5 to a target user (satellite business proprietor), from the integrated network system. The matching includes a conformity check of the satellite station 6 and the earth station 5, and pass scheduling.

Figure 13:
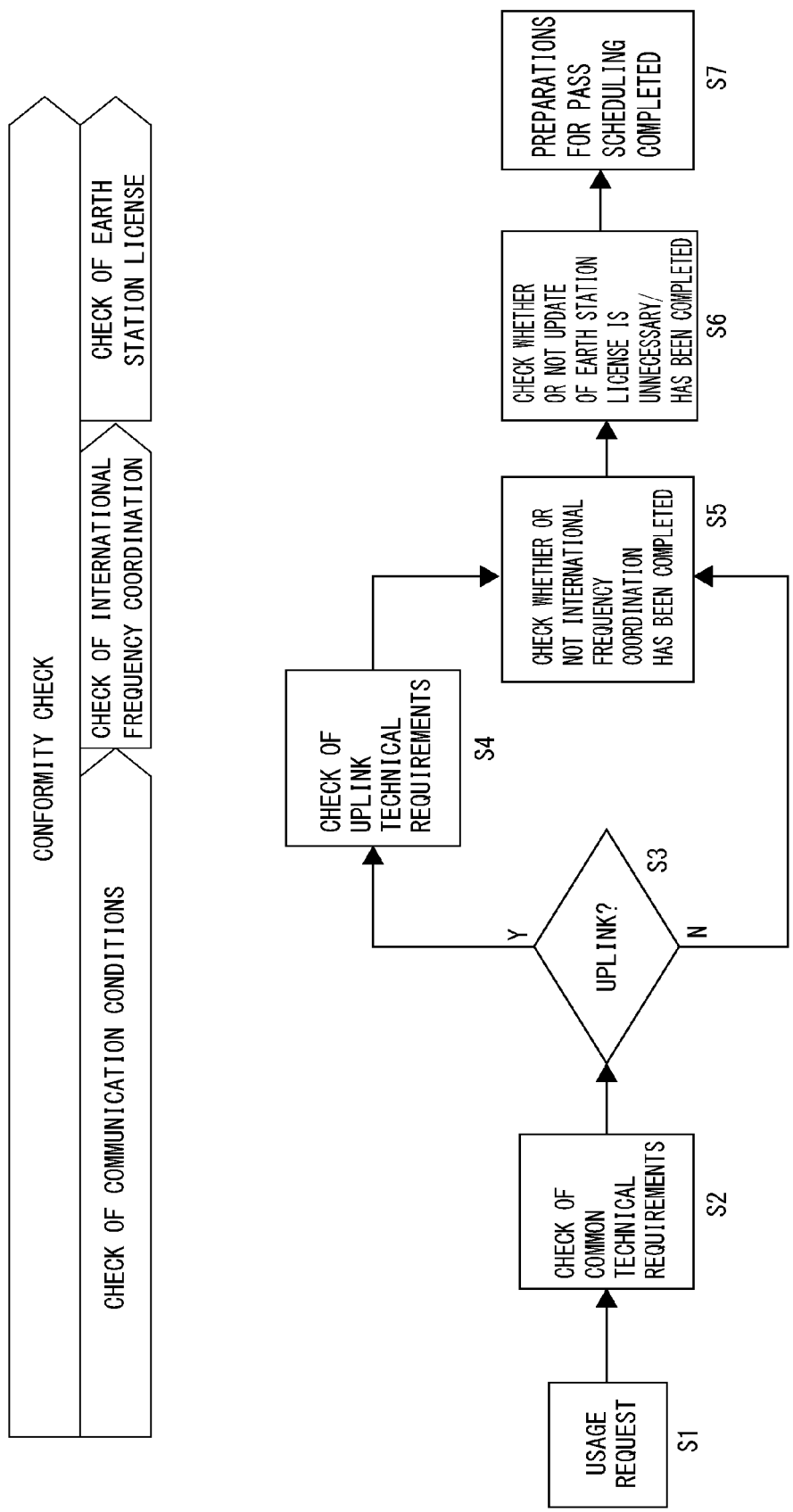
FIG. 13 is a diagram illustrating a flow of a conformity check at the time when a satellite business proprietor registers a satellite station.
Figure 14:
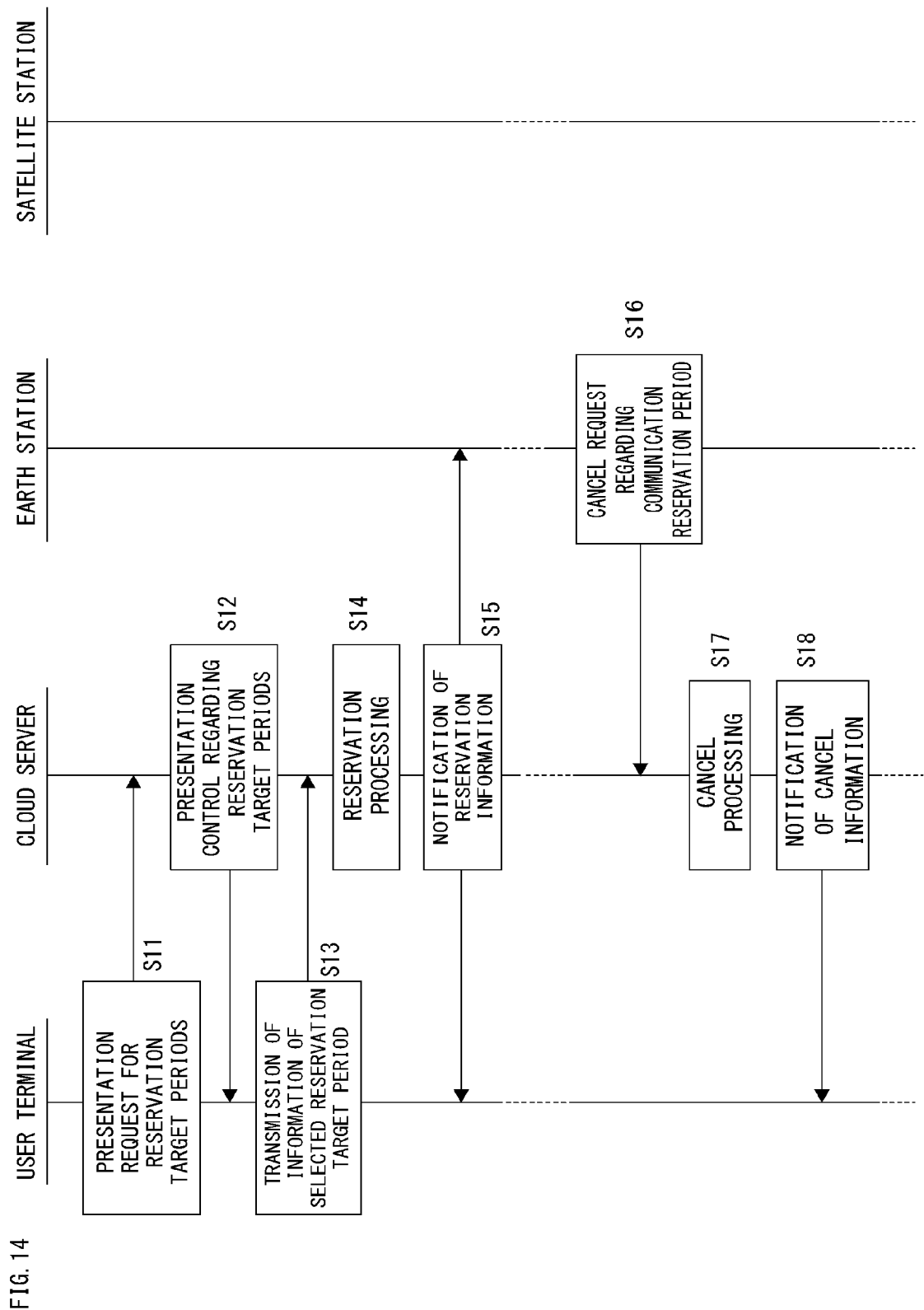
FIG. 14 is a diagram illustrating pass scheduling processing in an on-demand reservation plan (second plan).
Figure 15:
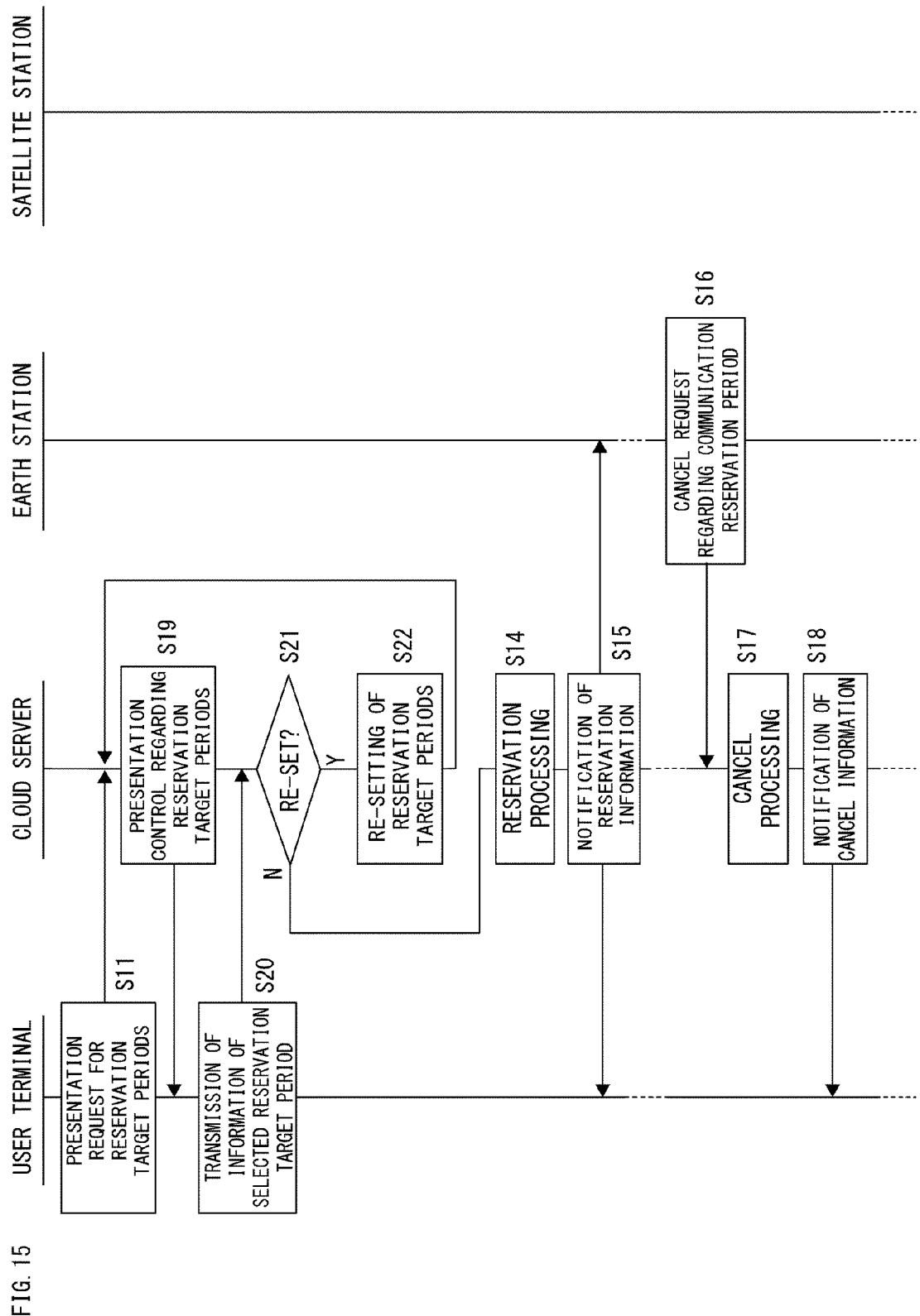
FIG. 15 is a diagram illustrating pass scheduling processing in a condition specification reservation plan (first plan).
Figure 16:
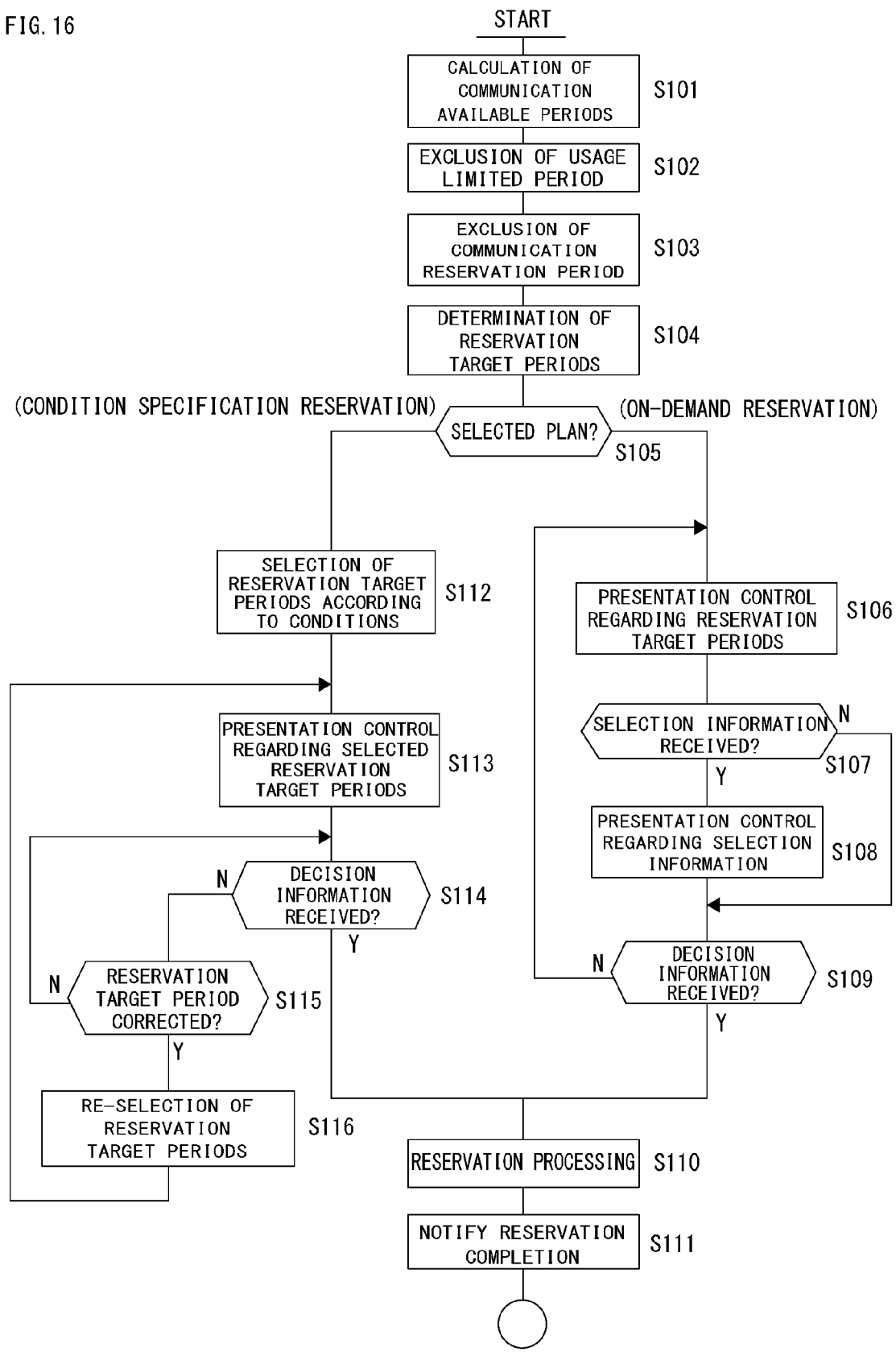
FIG. 16 is a flowchart of pass scheduling processing according to the plan selected by the satellite business proprietor.

FIG. 13 is a diagram illustrating a flow of the conformity check at the time when a satellite business proprietor registers a satellite station 6. FIG. 14 is a diagram illustrating pass scheduling processing in the on-demand reservation plan (second plan). FIG. 15 is a diagram illustrating pass scheduling processing in the condition specification reservation plan (first plan). FIG. 16 is a flowchart of pass scheduling processing according to the plan selected by the satellite business proprietor.

First, the flow of the conformity check at the time when the user as the satellite business proprietor registers a satellite station 6 will be described with reference to FIG. 13. The conformity check includes the check of communication conditions, the check of international frequency coordination, the check of an earth station license, and the like, and it is checked by the conformity check whether or not the satellite station 6 possessed by the user (satellite business proprietor) has compatibility to establish communication with the earth station 5 in the network system.

First, in step S1, the user (satellite business proprietor) presents a network system usage request to the administrator side. At this time, the user (satellite business proprietor) presents specification information regarding the satellite to the administrator side. Further, the user (satellite business proprietor) selects a plan for pass scheduling. The plan in this case may be a preliminarily prepared package plan such as the "condition specification reservation plan" or the "on-demand reservation plan," which will be described later, or may be an individually customized plan dedicated to a customer.

In general, the user (satellite business proprietor) has a minimum operation request and an operation request that varies. The minimum operation request includes an operation area request, an operation time request, or both of these. The minimum operation request does not change through the entire operation period of the satellite. In order to support the setting (reservation) of the communication reservation period based on the minimum operation request, the "condition specification reservation plan" is provided.

The user (satellite business proprietor) is able to specify conditions for an "area" and "time" in the "condition specification reservation plan."

For the "area," area information can be specified as a condition. The area information includes various kinds of information regarding an area, including an area such as Asia, Europe, or South America, a country name such as Japan, U.S.A., or UK, a city name such as Tokyo, California, or London, and a latitude and a longitude. By specifying the area information as a condition in the "area," the satellite business proprietor is able to narrow down the earth stations 5 on the basis of the area information.

Further, for the "time," time information can be specified as a condition. The time information encompasses various kinds of information regarding time, including information regarding clock times, such as 9:00 to 10:00, during which the satellite station 6 performs communication with a ground station 5, information regarding a desired length of communication duration time, such as one hour per day, although, in this case, there is no particular specification for clock times, and information regarding a desired communication frequency, such as multiple times of communication every hour.

The user (satellite business proprietor) is able to specify the conditions for the "area" and "time," and is also able to specify only the condition for either the "area" or the "time," in the "condition specification reservation plan."

For example, by specifying the conditions for the "area" and the "time," the user (satellite business proprietor) is able to limit the area or the country where an earth station 5 whose usage is desired by the user is located, and specify time when communication with the satellite station 6 is to be performed. This is useful in a case where the user desires communication with an earth station 5 located in the Asia area for one hour between 9:00 and 12:00 every day, for example.

Further, the user is also able to, without specifying the condition for the location ("area") of an earth station 5 whose usage is desired by the user, specify the condition for only usage time ("time") when communication with the satellite station 6 is to be performed. This is useful in a case where the user desires communication with an earth station 5 located in any area for one hour every day, for example.

In addition, the user is also able to, without specifying the condition for usage time ("time") when the communication with the satellite station 6 is to be performed, specify only the location ("area") of an earth station 5 whose usage is desired by the user.

Further, for the condition specification for the "condition specification reservation plan," without being limited to the conditions for the "area" and the "time," other various conditions, such as a usage fee, the specification of the ground station 5, and the name of a ground antenna business proprietor who possesses the ground station 5, may be specified.

The "on-demand reservation plan" is a plan that enables a user (satellite business proprietor) to confirm reservable reservation target periods and set (reserve) a reservation target period that the user (satellite business proprietor) has selected, as a communication reservation period.

In the user's (satellite business proprietor's) operation request that varies, there are an operation request that arises according to the status of the satellite station 6, and an operation request that arises according to the usage status of the satellite station 6. In order to support the setting (reservation) of the communication reservation period based on such an operation request that varies, the "on-demand reservation plan" is provided.

The "on-demand reservation plan" enables the user (satellite business proprietor) to select by itself a reservation target period desired by the user as a communication reservation period from a displayed list of reservation target periods, and set (reserve) the selected reservation target period as the communication reservation period. This enables the setting of the communication reservation period in which the intention of the user (satellite business proprietor) is further reflected.

Next, in step S2, for the satellite station 6 of the user (satellite business proprietor), common technical requirements are checked. That is, it is checked whether or not the satellite station 6 to be registered satisfies the most basic technical requirements, such as a minimum G/T (Gain-to-Noise Temperature Ratio) and the match of frequency, in matching with an earth station 5.

The check of the communication conditions, as the check of the technical requirements, includes the check of individual parameters, for example, whether the minimum G/T can be achieved, whether the frequency is matched, whether the required bandwidth can be supported, whether the modulation method is matched, whether the polarized wave is matched, and the like.

Note that the G/T is read as G over T, and is a major parameter indicating a performance of an antenna. The G/T means the ratio of an antenna gain to antenna noise plus converter noise. The larger G/T value an antenna has, the higher the performance of the antenna is.

Further, in step S3, it is determined whether or not to perform not only downlink communication but also uplink communication. In the case where the uplink communication to be performed, in step S4 prior to proceeding to step 5, technical requirements to be satisfied in the case of the uplink are checked.

The downlink means transmission from the satellite station 6 to the earth station 5, and the uplink means transmission from the earth station 5 to the satellite station 6.

Thereafter, in step S5, it is checked whether or not the international frequency coordination has been completed. Here, it is checked whether or not the international frequency coordination for the area of each of earth stations 5 that are to be targets of communication with the satellite station 6 has been completed. This is because only earth stations 5 for which a consensus building process (international frequency coordination) with respect to radio-wave interference with other communication business proprietors in the vicinity of a country or an area that is to be a counterpart of the communication of the satellite station 6 has been completed are permitted to perform communication. Thus, it follows that earth stations 5 for which the consensus building process has not been completed are to fail matching with the satellite station 6.

The international frequency coordination is technical coordination that, in order that a frequency to be used by a wireless communication network and usage conditions for the frequency do not cause and undergo harmful interference to/from wireless communication networks of other countries, is made in terms of frequency (inclusive of orbit location) by a responsible administrative agency that plans this wireless communication network (which, in Japan, is Ministry of Internal Affairs and Communications) prior to the usage of the frequency, on the basis of the prescript of the wireless communication regulations (RR: Radio Regulations) determined by the International Telecommunication Union (ITU). The purpose of the international frequency coordination is prior technical coordination that is made between responsible administrative agencies in order that harmful radio-wave interference does not arise between communication networks managed by the responsible administrative agencies. Particularly, in the case where an artificial satellite performs uplink and downlink communication, its satellite business proprietor is required to have completed the international frequency coordination in advance.

Next, in step S6, it is checked whether or not the update of an earth station license is unnecessary or has been completed. In order to communicate with the satellite station 6, the earth station 5 is required to have a license for the usage of the frequency (which may be unnecessary in the case of the downlink only). Further, the earth station 5 is required to update the license in the case where communication with a new satellite station 6 is performed and is thus required to undergo the check as to whether the update has been completed.

Note that the user (satellite business proprietor) may make a selection regarding plans for pass scheduling, not in step S1, but after the check of the communication conditions in step S2, the check of the international frequency coordination in step S5, the check of the earth station license in step S6, and any other check, that is, after the completion of the conformity checks. Further, the user (satellite business proprietor) may make a selection regarding plans such as the "condition specification reservation plan" and the "on-demand reservation plan," which have been described above, when the user (satellite business proprietor) performs the pass scheduling.

In step S7 subsequent to the completion of the procedures in steps S1 to S6, preparations for the pass scheduling using the network system of the present technology have been completed.

At this time, the cloud server 1 in the network system performs processing for setting a compatibility group for each of specifications for earth stations 5 on the basis of the obtained information regarding the earth stations 5. The compatibility group means a group of a plurality of earth stations 5 to which the whole (or part) of specifications for RF (Radio Frequency) communication is common. In this way, grouping of similar earth stations 5 (to which the whole or part of the specifications is common) is performed by using the technical specification used for the conformity check regarding the satellite station 6.

The technical specifications for the RF communication mean, for example, the center frequency, the frequency band, the polarized wave, the modulation method, the encoding method, and the like.

The cloud server 1 performs processing for storing, on the cloud, information regarding the compatibility groups of earth stations 5, together with specification information regarding the earth stations 5 and the satellite station 6.

Dividing earth stations 5 into the compatibility groups and storing the information regarding the compatibility groups in advance allows the cloud server 1 to, when performing the matching of the earth stations 5 with the satellite station 6, make an assignment of an optimum compatibility group that takes the specification of the satellite station 6 into consideration.

Next, pieces of processing that are performed according to a selected reservation method and that are performed by the cloud server 1, the user terminal 3, the earth station 5 (the user terminal 3 at the ground antenna business proprietor side), and the satellite station 6 in the network system of the present technology will be described with reference to FIGS. 14 and 15.

Note that, hereinafter, pieces of processing similar to the above pieces of processing described once will be denoted by the same reference signs as those of the above pieces of processing to avoid the duplication of description, and will be omitted from the following description.

FIG. 14 illustrates a flow of processing in the case where a user (satellite business proprietor) selects the "on-demand reservation plan" when reserving a communication reservation period.

When, in step S11, a presentation request for reservation target periods is transmitted to the cloud server 1 from the user terminal 3 at the satellite business proprietor side, in step S12, the cloud server 1 calculates communication available periods, thereafter selects reservation target periods from the communication available periods, and performs presentation control regarding the reservation target periods. Through this processing, the reservation target periods are displayed on the schedule screen of the user terminal 3 at the satellite business proprietor side.

Further, in step S13, when the user (satellite business proprietor) selects a reservation target period by operating the user terminal 3, the user terminal 3 transmits the information of the selected reservation target period to the cloud server 1.

In step S14, upon receipt of the information of the selected reservation target period, from the user terminal 3 at the satellite business proprietor side, the cloud server 1 performs reservation processing for setting (reserving) the selected reservation target period as a communication reservation period.

Upon completion of the reservation processing in step S14, in step S15, the cloud server 1 transmits information regarding the set (reserved) communication reservation period to the user terminal 3 at the satellite business proprietor side and the user terminal 3 at the ground antenna business proprietor (earth station 5) side. This processing enables both the satellite business proprietor and the ground antenna business proprietor to recognize that the communication reservation period has been set.

Further, as indicated in step S16, the ground antenna business proprietor is able to make a cancel request regarding a communication reservation period set (reserved) by the satellite business proprietor, via the user terminal 3 in the earth station 5.

Upon receipt of the cancel request from the user terminal 3 at the ground antenna business proprietor side (the earth station 5), in step S17, the cloud server 1 performs cancel processing on the communication reservation period set (reserved) by the satellite business proprietor. Upon completion of the cancel processing, in step S18, the cloud server 1 transmits information regarding the canceled communication reservation period to the user terminal 3 at the satellite business proprietor side. This processing enables the satellite business proprietor to recognize that the communication reservation period has been cancelled.

Note that the cloud server 1 is also capable of performing cancel processing on a communication reservation period set (reserved) by the satellite business proprietor, by receiving a cancel request from the user terminal 3 at the satellite business proprietor side.

FIG. 15 illustrates a flow of processing in the case where the user (satellite business proprietor) selects the "condition specification reservation plan" when reserving a communication reservation period.

When, in step S11, a presentation request for reservation target periods is transmitted to the cloud server 1 from the user terminal 3 at the satellite business proprietor side, in step S19, the cloud server 1 calculates communication available periods, and thereafter selects reservation target periods from the communication available periods on the basis of conditions (area information in "area," time information in "time," and the like) specified in advance by the satellite business proprietor. Further, the cloud server 1 performs presentation control regarding the selected reservation target periods. At this time, the reservation target periods from which reservation is planned to be made are displayed on the schedule screen of the user terminal 3.

At this time, the satellite business proprietor inputs the specification of conditions to the MCS of the user terminal 3.

Further, an assumption is made that, in the case where a quantitative condition such as "a communication duration time of five hours per day is desired" or "a communication duration time for one hour during 9:00 to 12:00 every day in the Asia area is desired" has been specified, the cloud server 1 automatically generates a list of a needed number of reservation target periods from communication available periods of earth stations 5, which have been matched with the condition, and presents the list to the user terminal 3 at the satellite business proprietor side. Thus, the satellite business proprietor does not need to perform, for example, processing for reserving communication reservation periods one by one.

Note that the cloud server 1 may set (reserve) a selected reservation target period as a communication reservation period, and may perform presentation control regarding the communication reservation period.

Further, in step S20, selection information regarding a selection made by an operation of the satellite business proprietor is transmitted to the cloud server 1 from the user terminal 3 at the satellite business proprietor side. The selection information mentioned here includes information indicating the approval of the reservation target periods that have been displayed on the user terminal 3 and are to become communication reservation periods (i.e., decision information), or information indicating the setting (reservation) of a reservation target period other than the displayed reservation target periods as a communication reservation period (i.e., re-setting information).

The cloud server 1 receives the selection information from the user terminal 3 at the satellite business proprietor side, and causes its processing to proceed to step S22 in the case where the cloud server 1 determines that the re-setting information has been received in step S21. In step S22, the cloud server 1 selects again reservation target periods that are to become communication reservation periods, and causes its processing to return to step S19 to perform presentation control regarding the selected reservation target periods.

Thereafter, when, in step S20, decision information is transmitted, by an operation of the satellite business proprietor, to the cloud server 1 from the user terminal 3 at the satellite business proprietor side, the cloud server 1 causes its processing to proceed from step S21 to step S14 to perform reservation processing for setting (reserving) the selected reservation target period as a communication reservation period, and, in step 15, transmits information regarding the set (reserved) communication reservation period to the user terminal 3 at the satellite business proprietor side and the user terminal 3 at the ground antenna business proprietor side (earth station 5).

Note that, when, in step S20, the cloud server 1 receives re-setting information from the user terminal 3 at the satellite business proprietor side, the cloud server 1 causes its processing to proceed to step S21, step S22, and step S19, and then, performs pieces of processing similar to the above-described pieces of processing.

Further, similarly to the "condition specification reservation," upon receipt of a request from the user terminal 3 at the ground antenna business proprietor side (earth station 5), the cancel processing regarding a communication reservation period can be performed through the flow of steps S16, S17, and S18.

Hereinafter, processing by the cloud server 1 in the pass scheduling for the network system according to the present technology will be described with reference to FIG. 16. Note that the processing by the cloud server 1 in the following description is processing performed by cooperation among at least the individual functions of the period calculation section 11, the reservation management section 12, and the presentation control section 13, which are illustrated in FIG. 1.

First, in step S101, the cloud server 1 performs processing for calculating communication available periods by verifying information regarding the latitude and longitude of the earth station 5 and information regarding the orbit of the satellite station 6.

Further, in step S102, the cloud server 1 performs processing for excluding, from the communication available periods, a period overlapping with a usage limited period (Unavailability Window) set in advance by the ground antenna business proprietor.

In step S103, the cloud server 1 performs processing for excluding, from the communication available periods, a communication reservation period for which reservation by another satellite business proprietor has already been decided. This processing makes it possible to prevent a pass conflict and efficiently increase an availability rate of antennas.

Further, in step S104, the cloud server 1 determines, as reservation target periods, the communication available periods left after the processing in steps S101 to S103.

After the determination of the reservation target periods, in step S105, the cloud server 1 makes a determination regarding the selected plan. The cloud server 1 obtains, from the cloud, information regarding the plan that the satellite business proprietor has selected in advance in step S1 of FIG. 13 when presenting the specification information regarding the satellite to the administrator side. Here, the cloud server 1 determines which of the "condition specification reservation plan" and the "on-demand reservation plan" has been selected, as the plan, by the satellite business proprietor.

Note that selection information regarding the plan such as the "condition specification reservation plan" and the "on-demand reservation plan" may not be recorded on the cloud in advance. In such a case, the cloud server 1 receives the selection information regarding the plan selected by the satellite business proprietor from the user terminal 3 after the log-in to the network system by the satellite business proprietor, thereby enabling the cloud server 1 to determine which of the "condition specification reservation plan" and the "on-demand reservation plan" has been selected.

In the case where, as the reservation method, the "on-demand reservation plan" has been selected, the cloud server 1 causes its processing to proceed from step S105 to step S106 to cause the user terminal 3 to present the reservation target periods. This processing enables the satellite business proprietor to select a communication reservation period from the reservation target periods that are reservable.

Thereafter, the cloud server 1 performs monitoring loop processing in the flow of steps S107, S109, and S106.

In step S107, upon receipt of the selection information regarding selection of reservation target periods that has been made by an operation of the user terminal 3 at the satellite business proprietor side, the cloud server 1 causes its processing to proceed to step S108 to cause the user terminal 3 to present the information of the selected reservation target periods. Thereafter, the cloud server 1 causes its processing to return to the above monitoring loop processing.

Further, in step S109, upon receipt of decision information regarding decision made by an operation of the user terminal 3 by the satellite business proprietor, in step S110, the cloud server 1 performs reservation processing for setting (reserving) the selected reservation target period as a communication reservation period.

Here, a situation in which communication reservation periods of a plurality of satellite business proprietors overlap with one another with respect to one earth station 5 (i.e., a pass conflict) may arise. Thus, in the reservation processing, the cloud server 1 first preferentially allocates communication reservation periods to satellite business proprietors having made area condition specifications for the "condition specification plan," and then, allocates communication reservation periods to satellite business proprietors having made time condition specifications. The number of allocatable reservation target periods for the area condition specification is more narrowly limited, and the flexibility of the allocation of communication reservation periods to reservation target periods for the time condition specification is higher. Thus, the above order is efficient. Further, finally, remaining reservation target periods for the "on-demand reservation plan" are presented. For example, in the case where one of two satellite business proprietors that conflict with each other specifies a specific duration time of a specific earth station 5 whereas the other satellite business proprietor does not specify any specific earth station 5 and requests "a pass having a length of five hours per day," allocating reservation target periods corresponding to different duration times and associated with different earth stations 5 to the latter satellite business proprietor makes it possible to achieve the allocation of communication reservation periods that satisfy the requests of both of the satellite business proprietors.

After the step S110, in step S111, the cloud server 1 transmits information regarding the reserved communication reservation period to the user terminal 3 and the earth station 5, and then terminates the processing of FIG. 16.

Here, the earth station 5 performs the decision of the communication reservation period in response to a request by the cloud server 1 and the decision of the communication reservation period by the ground antenna business proprietor itself. In addition to the above, the decision of the communication reservation period in response to a request by the satellite business proprietor is made by the cloud server 1.

To the ground antenna business proprietor and the satellite business proprietor, an API, a CLI, and a GUI for the reservation or scheduling of communication reservation periods are provided. This enables the ground antenna business proprietor or the satellite business proprietor to perform the pass scheduling from the GUI of StellarStation.

A request for the decision of the communication reservation period by the ground antenna business proprietor itself is prioritized over a request for the decision of the communication reservation period in response to the request by the cloud server 1 side.

Next, returning to step S105, in the case where the "condition specification reservation plan" has been selected as the reservation method, in step S112, the cloud server 1 selects reservation target periods that satisfy conditions specified by the satellite business proprietor side from among the reservation target periods. The cloud server 1 selects reservation target periods that match, for example, area information and time information input by the satellite business proprietor via the user terminal 3.

Further, in step S113, the cloud server 1 causes the user terminal 3 at the satellite business proprietor side to present the result of the selection. This processing enables the satellite business proprietor to avoid trouble of selecting specific reservation target periods to be communication reservation periods one by one, for example.

Thereafter, the cloud server 1 performs monitoring loop processing in the flow of steps S114 and S115.

In step S114, upon receipt of decision information regarding a decision made by an operation of the user terminal 3 by the satellite business proprietor, the cloud server 1 performs reservation processing for setting (reserving) the selected reservation target period as a communication reservation period in step S110, and transmits information regarding the reserved communication reservation period to the user terminal 3 and the earth station 5 in step S111. With this processing, the processing of FIG. 16 is completed.

Further, in step S115, upon receipt of information regarding a correction, for example, in a case where the satellite business proprietor desires to reserve a reservation target period other than the displayed reservation target periods as a communication reservation period, the cloud server 1 causes its processing to proceed to step S116.

In step S116, the cloud server 1 re-selects reservation target periods, and causes the user terminal 3 to present the re-set reservation target periods in step S113. Thereafter, the cloud server 1 causes its processing to proceed to monitoring loop processing of steps S114 and S115, and then, performs pieces of processing similar to the above-described pieces of processing.

<4. APIs Used in Cloud Server>

Here, APIs used in the cloud server 1 will be described. As the APIs, an API for a satellite business proprietor to make a call and an API for an earth station owner are prepared. Names and functions of the APIs will be described below.

"API for Datellite Business Proprietor"

CancelPlan: for cancelling the reservation of a communication reservation period ListPasses: for sending back a list of communication available periods of a specific satellite station 6

ListSatellitePlans: for sending back a list of communication reservation periods of a specific satellite station 6 together with their details OpenStream: for enabling the transmission of commands and the reception of telemetries to/from a satellite station 6

SchedulePass: for reserving a communication reservation period by using time for a specific satellite station 6

"API for Ground Antenna Business Proprietor"

AddGSUnavailabilityWindow: for setting a specific duration time or usage limited period ListGroundStationPlans: for sending back a list of reserved periods of a specific ground antenna ListGSUnavailabilityWindow: for sending back usage limited periods of a specific ground antenna DeleteGSUnavailabilityWindow: for deleting a usage limited period of a specific ground antenna <5. Outline of Communication Execution Based on Reserved Communication Reservation Periods>

Hereinafter, the outline of communication execution based on reserved communication reservation periods will be described with reference to FIG. 17. FIG. 17 is a diagram illustrating communication between a satellite station 6 and earth stations 5.

First, upon setting (reservation) of communication reservation periods for communication between the satellite station 6 and the earth stations 5, the cloud server 1 synchronizes information regarding a communication start time, a communication end time, and the like with respect to the satellite station 6 and the earth stations 5 among the user terminal 3, the satellite station 6, the earth stations 5, and the like.

In step S201, when the time of communication of the satellite station 6 in an earth station GS-A approaches, the API of the user terminal 3 issues an openstream request to the cloud server 1 to start communication with the earth station GS-A. Further, in step S202, when the time of the communication of the satellite station 6 in the earth station GS-A approaches, the earth station GS-A issues an openstream request to the cloud server 1 to start the communication with the earth station GS-A.

Further, when a start time (AOS-A) at which the communication becomes available in response to an event in which the satellite station 6 is located above the specific earth station GS-A has come, in step S203, bidirectional data transfer (Full Duplex Communication) is performed between the earth station GS-A and the satellite station 6.

When an end time (LOS-A) at which the communication between the earth station GS-A and the satellite station 6 ends has come, the API of the user terminal 3 issues a close request to the cloud server 1 to end the communication with the earth station GS-A in step S204, and the earth station GS-A also issues a close request to the cloud server 1 in step S205.

With this procedure, the communication ends, and the data transfer between the earth station GS-A and the satellite station 6 ends.

Next, in step S206, when the time of communication of the satellite station 6 in an earth station GS-B different from the earth station GS-A approaches, the API of the user terminal 3 issues an openstream request to the cloud server 1 to start the communication with the earth station GS-B. Further, in step S207, when the time of the communication of the satellite station 6 in the earth station GS-B approaches, the earth station GS-B issues an openstream request to the cloud server 1 to start the communication with the earth station GS-B.

Further, when a start time (AOS-B) at which the communication becomes available in response to an event in which the satellite station 6 is located above the specific earth station GS-B has come, in step S208, bidirectional data transfer (Full Duplex Communication) is performed between the earth station GS-B and the satellite station 6.

When an end time (LOS-B) at which the communication between the earth station GS-B and the satellite station 6 ends has come, the API of the user terminal 3 issues a close request to the cloud server 1 to end the communication with the earth station GS-B in step S209, and the earth station GS-B also issues a close request to the cloud server 1 in step S210.

With this procedure, the communication ends, and the data transfer between the earth station GS-B and the satellite station 6 ends.

As described above, the satellite business proprietor is able to perform communication between the satellite station 6 and each of the earth stations 5 without being conscious of scheduling of the communication between the satellite station 6 and the each of the earth stations 5.

<6. Summary>

The cloud server 1 described in the above embodiment includes the period calculation section 11 that calculates communication available periods for communication between a satellite station 6 and an earth station 5 on the basis of orbit information regarding the satellite station 6 and location information regarding the earth station 5, and the reservation management section 12 that performs reservation processing for reserving a communication reservation period for the communication between the earth station 5 and the satellite station 6, among reservation target periods selected from communication available periods (see FIG. 16).

This configuration makes it possible to reserve the communication reservation period from the reservation target periods that are further narrowed from the communication available periods.

This way of selecting the reservation target periods obtained by excluding, from the communication available periods during which wireless communication of the satellite station with the earth station is available, a duration time during which the earth station cannot be lent to any satellite business proprietor despite the fact that the time is included in the communication available periods because of a reason that, during the duration time, a ground antenna business proprietor uses its owned earth station for communication with its owned satellite station, or any other similar reason, makes it possible to efficiently perform reservation processing for reserving the communication reservation period. The satellite business proprietor, therefore, is able to reserve a communication reservation period on the basis of the reservation target periods having been narrowed from the communication available periods, and this configuration enables reduction of loads of the satellite business proprietor at the time of selecting communication available periods.

In the cloud server 1 of the present embodiment, the reservation management section 12 selects the reservation target periods from the communication available periods by performing selection processing according to the selected plan (see FIG. 16).

This configuration makes it possible to reserve a communication reservation period from the reservation target periods in which the contents of the selected plan are reflected.

For the selection of an earth station 5 that is to perform communication with a satellite station 6, there exist various users (satellite business proprietors), such as a user that accepts any selected earth station 5 provided that it satisfies required conditions, and a satellite business proprietor that desires to select an earth station 5 to perform communication by making a determination by the satellite business proprietor itself after checking information regarding individual earth stations 5. Providing a plurality of plans in which such various needs are reflected to enable each satellite business proprietor to select any one of the plans makes it possible to achieve flexible reservation of a communication reservation period in which the desire of the satellite business proprietor is reflected.

In the cloud server 1 of the present embodiment, in a network including a plurality of earth stations 5 conforming to mutually different technical specifications, the period calculation section 11 and the reservation management section 12 perform respective pieces of processing for the plurality of earth stations 5 (see FIG. 1).

This configuration enables the plurality of earth stations 5 conforming to mutually different technical specifications to be connected on a network, and earth stations 5 communicable with a satellite station 6 are selected from the plurality of earth stations 5 connected on the network.

Therefore, the cloud server 1 can control the plurality of earth stations 5 conforming to mutually different technical specifications on the network, and thus, the range of earth stations 5 selectable by a user (satellite business proprietor) can be expanded. This configuration enables the user (satellite business proprietor) to reserve a communication reservation period for communication with an earth station 5 on which period the desire of the user itself is further reflected.

The cloud server 1 according to the present embodiment includes the presentation control section 13 that causes the reservation target periods selected by the reservation management section 12 to be presented. With this configuration, the reservation target periods that are reservable are presented on the user terminal 3 of the user (satellite business proprietor) (see S106 and S113 in FIG. 16).

The satellite business proprietor, therefore, is able to, after referring to the reservation target periods displayed on the user terminal 3, consider whether to perform communication using the communication reservation period reserved according to the plan selected by the satellite business proprietor. Further, in the case where there exists a different reservation target period that the satellite business proprietor desires to reserve as a communication reservation period other than the reservation target period selected as the communication reservation period according to the plan, the satellite business proprietor is able to change the reservation so as to cause the different reservation target period to be reserved as a communication reservation period.

Further, the satellite business proprietor is also able to, after reserving the communication reservation period according to the plan selected by the satellite business proprietor, further select and add a communication reservation period from the reservation target periods having been referred to.

The reservation management section 12 of the cloud server 1 according to the present embodiment does not select, as a reservation target period, a communication available period (usage limited period) for which a usage limitation is specified by an earth station 5 (see S102 in FIG. 16).

This configuration enables a ground antenna business proprietor to prevent a period during which communication with its owned satellite station 6 is to be performed in the earth station 5 from being reserved by a satellite business proprietor as a communication reservation period, by setting the period as a usage limited period. Further, the ground antenna business proprietor may set, as usage limited periods, a period for performing maintenance of its owned earth station 5, a period during which its owned ground antenna is lent to a different satellite business proprietor for the purpose of a usage outside the network system of the present technology, and any other period.

This way of excluding a usage limited period from communication available periods in advance at the time of selecting a reservation target period from the communication available periods enables a ground antenna business proprietor to flexibly lend a reservation target period to a satellite business proprietor, and also enables a satellite business proprietor to easily recognize periods reservable as a communication reservation period.

In the cloud server 1 of the present embodiment, as the selection processing in the case where a first plan (condition specification reservation plan) is selected, the reservation target periods are selected from the communication available periods on the basis of a condition specified by a user (satellite business proprietor) (see S112 to S116 in FIG. 16).

That is, upon selection of the first plan from a plurality of plans, the reservation target periods according to conditions associated with an area, time, and the like, which have been specified by the user (satellite business proprietor) are automatically selected (see S112 in FIG. 16).

The user (satellite business proprietor), therefore, is able to, without checking information regarding all the earth stations 5, reserve a reservation target period in which the desire of the satellite business proprietor is reflected as a communication reservation period. This configuration achieves enhancement of the convenience at the time when the satellite business proprietor reserves a communication reservation period.

In the cloud server 1 of the present embodiment, the condition specified by the user (satellite business proprietor) includes location information regarding an earth station 5 that is to perform communication with a satellite station 6 (see S112 in FIG. 16).

With this configuration, a reservation target period is selected from communication available periods in communicable earth stations 5 on the basis of location information regarding the earth stations 5 specified by the user (satellite business proprietor). The satellite business proprietor, therefore, is able to reserve a communication reservation period from earth stations 5 on which its desire in terms of area is reflected.

In the cloud server 1 of the present embodiment, the condition specified by the user (satellite business proprietor) includes time information regarding a duration time during which an earth station 5 and a satellite station 6 are to perform communication (see S112 in FIG. 16).

With this configuration, on the basis of time information regarding a duration time during which the user (satellite business proprietor) desires to perform communication between its owned satellite station 6 and an earth station 5, a reservation target period is selected from communication available periods in earth stations 5 communicable during the duration time. The satellite business proprietor, therefore, is able to reserve a communication reservation period in which its desire in terms of communication duration time is reflected.

In the cloud server 1 of the present embodiment, as the selection processing in the case where a second plan (on-demand reservation plan) is selected, the reservation management section 12 selects, as a communication reservation period for communication between a satellite station 6 and an earth station 5, a reservation target period selected by the user (satellite business proprietor) from among the reservation target periods presented by the presentation control section 13 (see S106 to S109 in FIG. 16).

With this configuration, upon selection of the second plan (on-demand reservation plan) from the plurality of plans, a user (satellite business proprietor) reserves a communication reservation period that the user has selected from among reservation target periods of communicable earth stations 5 on the basis of selection of the user itself.

The satellite business proprietor, therefore, is able to, after additionally taking into consideration information regarding earth stations 5 that are to perform communication and the statuses of reservation target periods, select and reserve a communication reservation period.

Upon receipt of cancel information regarding a communication reservation period reserved for communication between a satellite station 6 and an earth station 5 from the earth station 5, the reservation management section 12 of the cloud server 1 of the present embodiment performs processing for cancelling the reserved communication reservation period (S16 to S18 in FIG. 14).

This configuration makes it possible to, with respect to a communication reservation period reserved by a satellite business proprietor, cancel the communication reservation period from the ground antenna business proprietor side. Thus, it is possible to preliminarily notify the satellite business proprietor of a situation in which the communication with the ground antenna during the communication reservation period has become unavailable.

An information processing method performed by the cloud server 1 described in the above embodiment includes a period calculation step of calculating communication available periods for communication between a satellite station 6 and an earth station 5 on the basis of orbit information regarding the satellite station 6 and location information regarding the earth station 5, and a reservation management step of selecting reservation target periods from the communication available periods by performing selection processing according to a selected plan, and reserving a communication reservation period for the communication between the satellite station 6 and the earth station 5 from the selected reservation target periods.

Performing the above processing by the cloud server 1 makes it possible to reserve the communication reservation period from the reservation target periods in which the contents of the selected plan are reflected.

<7. Program and Storage Medium>

Heretofore, the cloud server 1 as an embodiment of the information processing device of the present technology has been described. A program according to the embodiment is a program for causing an information processing device (CPU etc.) to perform the individual pieces of processing in the cloud server 1.

The program of the embodiment is a program that causes an information processing device to perform a period calculation function of calculating communication available periods for communication between a satellite station and an earth station on the basis of orbit information regarding the satellite station and location information regarding the earth station, and a reservation management function of performing reservation processing for reserving a communication reservation period for the communication between the earth station and the satellite station, among reservation target periods selected from the communication available periods.

That is, this program is a program that causes the cloud server 1 to perform the pieces of processing described in FIGS. 16 and 17.

This program makes it possible to implement an information processing device serving as the cloud server 1. Such a program can be stored in advance in an HDD as a recording medium incorporated in equipment such as a computer device, or a ROM or the like inside a microcomputer that includes a CPU. Further, the program can be stored (recorded) temporarily or permanently in a removable recording medium such as a semiconductor memory, a memory card, an optical disk, a magneto-optical disk, or a magnetic disk. Such a removable recording medium can be provided as what is called package software.

Such a program can be installed from the removable recording medium to a personal computer or the like. In addition to the above, such a program can be downloaded from a download site via a network such as a LAN or the Internet.

Lastly, the description of the embodiments described above is just an example of the present technology, and the present technology is not limited to the above-described embodiments. Thus, naturally, other than the above-described embodiments, various modifications may be made according to actual designs and the like without departing from the technical thought of the present technology. Further, the effects described in the present specification are mere examples and do not limit the effects of the present technology. The present technology may have other effects.

REFERENCE SIGNS LIST

1: Cloud server
3: User Terminal
4: Earth station control device
5: Earth station
6: Satellite station
11: Period calculation section
12: Reservation management section
13: Presentation control section

What is claimed is:

1. An information processing device comprising:
at least one memory configured to store computer program code;
at least one processor configured to access the computer program code and operate as instructed by the computer program code, the computer program code including:
period calculation code configured to cause the at least one processor to calculate a communication available period for communication between a satellite station and an earth station on a basis of orbit information regarding the satellite station and location information regarding the earth station; and
reservation management code configured to cause the at least one processor to perform reservation processing for reserving a communication reservation period for the communication between the satellite station and the earth station, among reservation target periods selected from the communication available period.

2. The information processing device according to claim 1, wherein the reservation management code is configured to cause the at least one processor to select the reservation target periods from the communication available period by performing selection processing according to a selected plan.

3. The information processing device according to claim 2, wherein, as the selection processing in a case where a first plan is selected, the reservation target periods are selected from the communication available period on a basis of a condition specified by a user.

4. The information processing device according to claim 3, wherein the condition specified by the user includes area information regarding an area within which the satellite station and the earth station are to perform the communication.

5. The information processing device according to claim 3, wherein the condition specified by the user includes time information regarding a duration time during which the satellite station and the earth station are to perform the communication.

6. The information processing device according to claim 2, wherein, as the selection processing in a case where a second plan is selected, the reservation management code is configured to cause the at least one processor to select, as the communication reservation period for the communication between the satellite station and the earth station, a reservation target period selected by a user from among the reservation target periods.

7. The information processing device according to claim 1, wherein, in a network including a plurality of earth stations conforming to mutually different technical specifications, the period calculation code and the reservation management section code are configured to cause the at least one processor to perform the respective pieces of processing for the plurality of earth stations.

8. The information processing device according to claim 1, further comprising:
presentation control code configured to cause the at least one processor to cause the reservation target periods selected by the reservation management code to be presented.

9. The information processing device according to claim 1, wherein the reservation management code is configured to cause the at least one processor not to select, as the reservation target periods, a period which is a portion of the communication available period calculated by the period calculation code and for which a usage limitation has been specified by an earth station.

10. An information processing method performed by an information processing device including at least one processor, the method comprising:
calculating a communication available period for communication between a satellite station and an earth station on a basis of orbit information regarding the satellite station and location information regarding the earth station; and performing reservation processing for reserving a communication reservation period for the communication between the satellite station and the earth station, among reservation target periods selected from the communication available period.

11. A non-transitory storage medium readable by a computer, the storage medium storing a program that causes an information processing device to perform:

a period calculation function of calculating a communication available period for communication between a satellite station and an earth station on a basis of orbit information regarding the satellite station and location information regarding the earth station; and a reservation management function of performing reservation processing for reserving a communication reservation period for the communication between the satellite station and the earth station, among reservation target periods selected from the communication available period.

* * * * *